(12) United States Patent
Xu et al.

(10) Patent No.: US 12,380,687 B2
(45) Date of Patent: Aug. 5, 2025

(54) OBJECT DETECTION METHOD AND APPARATUS, AND COMPUTER STORAGE MEDIUM

(71) Applicant: HUAWEI TECHNOLOGIES CO., LTD., Guangdong (CN)

(72) Inventors: Hang Xu, Hong Kong (CN); Zhenguo Li, Hong Kong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 364 days.

(21) Appl. No.: 17/553,236

(22) Filed: Dec. 16, 2021

(65) Prior Publication Data

US 2022/0108546 A1 Apr. 7, 2022

Related U.S. Application Data

(63) Continuation of application No. PCT/CN2020/089438, filed on May 9, 2020.

(30) Foreign Application Priority Data

Jun. 17, 2019 (CN) .......................... 201910523157.5

(51) Int. Cl.
*G06V 10/82* (2022.01)
*G06N 3/08* (2023.01)
(Continued)

(52) U.S. Cl.
CPC .............. *G06V 10/82* (2022.01); *G06N 3/08* (2013.01); *G06N 5/02* (2013.01); *G06V 10/764* (2022.01); *G06V 10/7715* (2022.01)

(58) Field of Classification Search
CPC ................ G06V 10/82; G06V 10/764; G06V 10/77–7715; G06N 3/08; G06N 3/0895;
(Continued)

(56) References Cited

U.S. PATENT DOCUMENTS

2017/0169315 A1 6/2017 Vaca Castano et al.
2017/0316285 A1* 11/2017 Ahmed ..................... G06T 7/11
(Continued)

FOREIGN PATENT DOCUMENTS

CN 108268651 A 7/2018
CN 108388879 A 8/2018
(Continued)

OTHER PUBLICATIONS

J. Johnson, A. Karpathy and L. Fei-Fei, "DenseCap: Fully Convolutional Localization Networks for Dense Captioning," in 2016 IEEE Conference on Computer Vision and Pattern Recognition (CVPR), Las Vegas, NV, USA, 2016 pp. 4565-4574. doi: 10.1109/CVPR.2016.494 (Year: 2016).*

(Continued)

*Primary Examiner* — Amir Alavi
*Assistant Examiner* — Jack Peter Kraynak
(74) *Attorney, Agent, or Firm* — Fish & Richardson P.C.

(57) ABSTRACT

This application provides example object detection methods and apparatuses. This application relates to the field of artificial intelligence, and specifically, to the field of computer vision. One example method includes obtaining a to-be-detected image and performing convolution processing on the to-be-detected image to obtain an initial image feature of a to-be-detected object in the to-be-detected image. Based on knowledge graph information, an enhanced image feature of the to-be-detected object is determined. A candidate frame and a classification of the to-be-detected object is determined based on the initial image feature and the enhanced image feature of the to-be-detected object. The enhanced image feature indicates semantic information of a different object category corresponding to another object associated with the to-be-detected object.

20 Claims, 9 Drawing Sheets

(51) Int. Cl.
*G06N 5/02* (2023.01)
*G06V 10/764* (2022.01)
*G06V 10/77* (2022.01)

(58) Field of Classification Search
CPC .......... G06N 3/09; G06N 3/091; G06N 3/092; G06N 3/094; G06N 3/096; G06N 3/098; G06N 3/0985; G06N 5/02
See application file for complete search history.

(56) References Cited

U.S. PATENT DOCUMENTS

| | | | |
|---|---|---|---|
| 2019/0087686 A1* | 3/2019 | Du | G06V 40/165 |
| 2019/0102605 A1 | 4/2019 | Du | |
| 2019/0147602 A1* | 5/2019 | Tao | G06V 10/809 382/103 |
| 2020/0380292 A1* | 12/2020 | Tang | G06V 10/87 |
| 2022/0092351 A1* | 3/2022 | Huang | G06V 10/95 |

FOREIGN PATENT DOCUMENTS

| | | | | |
|---|---|---|---|---|
| CN | 108846826 A | | 11/2018 | |
| CN | 109389055 A | * | 2/2019 | ......... G06K 9/00718 |
| CN | 109711434 A | | 5/2019 | |
| CN | 109740478 A | | 5/2019 | |
| CN | 109872362 A | * | 6/2019 | |
| CN | 110378381 A | | 10/2019 | |
| CN | 111310604 A | | 6/2020 | |

OTHER PUBLICATIONS

Z. Peng, L. Wu, J. Ren, R. Zhang and P. Luo, "CUImage: A Neverending Learning Platform on a Convolutional Knowledge Graph of Billion Web Images," 2018 IEEE International Conference on Big Data (Big Data), Seattle, WA, USA, 2018, pp. 1787-1796, doi: 10.1109/BigData.2018.8622090. (Year: 2018).*

Monti, Federico & Boscaini, Davide & Masci, Jonathan & Rodolà, Emanuele & Bronstein, Michael. (2016). Geometric deep learning on graphs and manifolds using mixture model CNNs. 10.48550/arXiv. 1611.08402. (Year: 2016).*

Deng, J. et al. (2014). Large-Scale Object Classification Using Label Relation Graphs. In: Fleet, D., Pajdla, T., Schiele, B., Tuytelaars, T. (eds) Computer Vision—ECCV 2014. ECCV 2014. Lecture Notes in Computer Science, vol. 8689. Springer, Cham. (Year: 2014).*

Chen, X., Li, L., Fei-Fei, L., & Gupta, A. K. (2018). Iterative Visual Reasoning Beyond Convolutions. 2018 IEEE/CVF Conference on Computer Vision and Pattern Recognition, 7239-7248. (Year: 2018).*

T. Chen, W. Yu, R. Chen and L. Lin, "Knowledge-Embedded Routing Network for Scene Graph Generation," in 2019 IEEE/CVF Conference on Computer Vision and Pattern Recognition (CVPR), Long Beach, CA, USA, 2019, pp. 6156-6164, doi: 10.1109/CVPR.2019.00632 (Year: 2019)*

B. Xu, Y. Wong, J. Li, Q. Zhao and M. S. Kankanhalli, "Learning to Detect Human-Object Interactions With Knowledge," 2019 IEEE/CVF Conference on Computer Vision and Pattern Recognition (CVPR), Long Beach, CA, USA, 2019, pp. 2019-2028, doi: 10.1109/CVPR.2019.00212 (Year: 2019).*

P. F. Felzenszwalb, R. B. Girshick, D. McAllester and D. Ramanan, "Object Detection with Discriminatively Trained Part-Based Models," in IEEE Transactions on Pattern Analysis and Machine Intelligence, vol. 32, No. 9, pp. 1627-1645, Sep. 2010, doi: 10.1109/TPAMI.2009.167. (Year: 2010).*

Office Action issued in Chinese Application No. 201910523157.5 on Sep. 27, 2022, 7 pages.

Mottaghi et al., "The Role of Context for Object Detection and Semantic Segmentation in the Wild," 2014 IEEE Conference on Computer Vision and Pattern Recognition, Jun. 2014, 8 pages.

PCT International Search Report and Written Opinion issued in International Application No. PCT/CN2020/089438 on Aug. 11, 2020, 17 pages (with English translation).

Ren et al., "Faster R-CNN: Towards Real-Time Object Detection with Region Proposal Networks," Advances in Neural Information Processing Systems, Dec. 2015, 14 pages.

Xu et al., "Reasoning-RCNN: Unifying Adaptive Global Reasoning into Large-scale Object Detection," Proceedings of the IEEE/CVF Conference on Computer Vision and Pattern Recognition, Jun. 2019, 10 pages.

Xu et al., "Spatial-aware Graph Relation Network for Large-scale Object Detection," Proceedings of the IEEE/CVF Conference on Computer Vision and Pattern Recognition, Jun. 2019, 10 pages.

\* cited by examiner

OBJECT DETECTION METHOD AND APPARATUS, AND COMPUTER STORAGE MEDIUM

CROSS-REFERENCE TO RELATED APPLICATIONS

This application is a continuation of International Application No. PCT/CN2020/089438, filed on May 9, 2020, which claims priority to Chinese Patent Application No. 201910523157.5, filed on Jun. 17, 2019. The disclosures of the aforementioned applications are hereby incorporated by reference in their entireties.

TECHNICAL FIELD

This application relates to the field of computer vision, and more specifically, to an object detection method and apparatus, and a computer storage medium.

BACKGROUND

Computer vision is an integral part of various intelligent/autonomous systems in various application fields, such as manufacturing industry, inspection, document analysis, medical diagnosis, and military affairs. The computer vision is knowledge about how to use a camera/video camera and a computer to obtain required data and information of a photographed subject. To be vivid, eyes (the camera/video camera) and a brain (algorithms) are mounted on the computer to replace human eyes to recognize, track, and measure a target, so that the computer can perceive an environment. Perceiving may be considered as extracting information from a perceptual signal. Therefore, computer vision may also be considered as a science of studying how to enable an artificial system to "perceive" an image or multi-dimensional data. Generally, computer vision uses various imaging systems functioning like visual organs to obtain input information, and then the computer, functioning like a brain, processes and interprets the input information. An ultimate study objective of computer vision is to enable the computer to observe and understand the world through vision in a way that human beings do, and to have a capability of autonomously adapting to the environment.

Object detection is a specific application in the field of computer vision. Object detection refers to a process of labeling a position of an object and a category of the object in a picture or a video. In a conventional solution, generally different objects in a to-be-detected picture are separately detected, to determine a position and a category of each object in the to-be-detected picture. However, in many scenarios (for example, when there are a large quantity of objects in the to-be-detected picture, and objects are severely blocked each other), a detection effect of the conventional solution is not desirable.

SUMMARY

This application provides an object detection method and apparatus, and a computer storage medium, to improve an effect of object detection.

According to a first aspect, an object detection method is provided. The method includes: obtaining a to-be-detected image; performing convolution processing on the to-be-detected image to obtain an initial image feature of a to-be-detected object; determining an enhanced image feature of the to-be-detected object based on knowledge graph information; and determining a candidate frame and a classification of the to-be-detected object based on the initial image feature of the to-be-detected object and the enhanced image feature of the to-be-detected object.

The knowledge graph information includes association relationships between different object categories corresponding to different objects in the to-be-detected image, and the enhanced image feature of the to-be-detected object indicates semantic information of an object category corresponding to another object associated with the to-be-detected object.

The determined candidate frame of the to-be-detected object may be a final candidate frame of the to-be-detected object, and the determined classification of the to-be-detected object may be a final classification (result) of the to-be-detected object.

The object detection method may be applied to different application scenarios. For example, the object detection method may be applied to a scenario in which everything is identified, or may be applied to a scenario in which a street view is identified.

When the method is applied to the scenario in which everything is identified by using a mobile terminal, the to-be-detected image may be an image shot by a camera of the mobile terminal, or may be an image already stored in an album of the mobile terminal.

When the method is applied to the scenario in which a street view is identified, the to-be-detected image may be a street view image shot by a camera on a roadside.

The initial image feature and the enhanced image feature each may be specifically a convolution feature graph.

The object detection method may be performed by a neural network. Specifically, the object detection method may be performed by a convolutional neural network (CNN) or a deep neural network (DNN).

Optionally, the performing convolution processing on the to-be-detected image includes: performing convolution processing on the to-be-detected image by using the convolutional neural network (CNN) or the deep neural network (DNN).

Optionally, the method further includes: determining an initial candidate frame and an initial classification of the to-be-detected object based on the initial image feature of the to-be-detected object.

In a process of determining the initial candidate frame and the initial classification of the to-be-detected object, convolution processing is generally first performed on the entire image of the to-be-detected image to obtain a convolution feature of the entire to-be-detected image; and then the to-be-detected image is divided into different square frames based on a fixed-size requirement, a feature corresponding to an image in each square frame is scored, a square frame with a higher score is selected as the initial candidate frame, and an initial classification of an image corresponding to the initial candidate frame is determined based on an image feature corresponding to the initial candidate frame.

For example, the to-be-detected image is a first image. To obtain an initial candidate frame and an initial classification of a to-be-detected object in the first image, convolution processing may be first performed on the entire first image to obtain a convolution feature of the entire first image; and then the first image is divided into 3×3 square frames, and a feature corresponding to an image in each square frame is scored. Finally, a square frame A and a square frame B that each have a higher score may be selected as initial candidate frames; and then an initial classification of an image in the square frame A is determined based on a feature corresponding to the image in the square frame A, and an initial classification of an image in the square frame B is determined based on a feature corresponding to the image in the square frame B.

In this application, when object detection is performed on the to-be-detected image, a detection result of the to-be-detected object is comprehensively determined based on the initial image feature and the enhanced image feature of the to-be-detected object. Therefore, this manner can be used to obtain a better detection result, compared with a manner of obtaining the detection result by considering only the initial image feature of the to-be-detected object.

Specifically, in this application, when the detection result of the to-be-detected object is determined, not only the initial image feature reflecting a feature of the to-be-detected object is considered, but also the semantic information of the another object associated with the to-be-detected object in the to-be-detected image is considered. In this application, the detection result of the to-be-detected object is comprehensively determined by combining the feature of the to-be-detected object and a feature of the associated another object, thereby improving accuracy of the detection result of the to-be-detected object to some extent.

For example, there is a to-be-detected first object in the to-be-detected image, and objects associated with the first object in the to-be-detected image include a road and a person. In this case, a detection result of the first object may be determined by comprehensively considering an initial image feature extracted from the first object and semantic information of the person and the road. It is assumed that an initial classification result of the first object is a bicycle. Because there is a high possibility that the person and the road occur simultaneously with the bicycle, confidence that the first object is a bicycle can be increased by using the semantic information of the person and the road, thereby finally improving accuracy of the detection result of the first object.

Optionally, the performing convolution processing on the to-be-detected image to obtain an initial image feature of the to-be-detected object includes:

performing convolution processing on the entire to-be-detected image to obtain a complete image feature of the to-be-detected image; and determining an image feature that is in the complete image feature of the to-be-detected image and that corresponds to the to-be-detected object as the initial image feature of the to-be-detected object.

In this application, convolution processing is first performed on the entire to-be-detected image to obtain the complete image feature of the to-be-detected image, and then the image feature corresponding to the to-be-detected object is obtained from the complete image feature of the to-be-detected image. Compared with a manner of separately obtaining an image feature corresponding to each to-be-detected object each time, this manner of obtaining the image feature of the to-be-detected object can reduce complexity of obtaining the image feature of the to-be-detected object.

Optionally, the determining an enhanced image feature of the to-be-detected object based on knowledge graph information includes: determining graph structure information based on the knowledge graph information and memory pool information; and determining the enhanced image feature of the to-be-detected object based on the graph structure information.

The determining graph structure information based on the knowledge graph information and memory pool information may also be referred to as generating a graph structure based on the knowledge graph information and the memory pool information.

The graph structure information (or may be referred to as the graph structure) may include a plurality of nodes. Each node corresponds to one object category, there is a specific association relationship between object categories (or may be referred to as object classifications) corresponding to interconnected nodes, and each node includes semantic information of a corresponding object category. The graph structure may generally include a plurality of nodes. Object categories corresponding to the plurality of nodes may include an object category of the to-be-detected object and another object category associated with the object category of the to-be-detected object.

When the enhanced image feature of the to-be-detected object is determined based on the graph structure information, a node corresponding to the object category of the to-be-detected object in the graph structure may be specifically determined based on the graph structure information, and then semantic information of a surrounding node of the node is extracted, so that the enhanced image feature of the to-be-detected object is obtained.

In addition, the graph structure information may be specifically generated based on a type of an object category included in the memory pool information and association relationships between different object categories included in the knowledge graph information.

For example, the knowledge graph information includes association relationships among 1000 object categories, and the memory pool information includes classification layer parameters of 100 object categories. In this case, association relationships among the 100 object categories recorded in the memory pool information may be obtained from the knowledge graph information, and then the graph structure may be constructed based on the association relationships among the 100 object categories (the graph structure includes 100 nodes, and the 100 nodes correspond to the 100 object categories).

Optionally, the determining a candidate frame and a classification of the to-be-detected object based on the initial image feature of the to-be-detected object and the enhanced image feature of the to-be-detected object includes: combining the initial image feature of the to-be-detected object and the enhanced image feature of the to-be-detected object to obtain a final image feature of the to-be-detected object; and determining the candidate frame and the classification of the to-be-detected object based on the final image feature of the to-be-detected object.

Specifically, the initial image feature of the to-be-detected object and the enhanced image feature of the to-be-detected object may correspond to tensors of different dimensions, and a tensor corresponding to the final image feature of the to-be-detected object may be obtained by combining the tensor corresponding to the initial image feature of the to-be-detected object and the tensor corresponding to the enhanced image feature of the to-be-detected object.

For example, the initial image feature of the to-be-detected object is a convolution feature graph whose size is $M1 \times N1 \times C1$, and the enhanced image feature of the to-be-detected object is a convolution feature graph whose size is $M1 \times N1 \times C2$. Therefore, the final image feature of the to-be-detected object may be obtained by combining the two convolution feature graphs, and the final image feature is a convolution feature graph whose size is $M1 \times N1 \times (C1+C2)$.

With reference to the first aspect, in some implementations of the first aspect, the knowledge graph information is preset.

Specifically, the knowledge graph information may be preset based on experience. For example, the knowledge graph information may be set or generated based on an association relationship between objects of different categories manually labeled.

For example, the knowledge graph information may be determined by manually counting a similarity between objects of different categories and a probability that objects of different categories simultaneously occur.

With reference to the first aspect, in some implementations of the first aspect, the association relationship between different object categories corresponding to different objects in the to-be-detected image includes at least one of the following information: an attribute association relationship between different object categories; a positional relationship between different object categories; a similarity between word vectors of different object categories; or a probability that different object categories simultaneously occur.

The attribute association relationship between different object categories may specifically refer to whether objects of different categories have a same attribute. For example, if a color of an apple is red, and a color of a strawberry is also red, the apple and the strawberry have a same color attribute (in other words, the apple and the strawberry are close in the color attribute).

With reference to the first aspect, in some implementations of the first aspect, the knowledge graph information is obtained by training a neural network model based on training data, where the training data includes a training image and object categories to which different objects in the training image belong.

The training image may generally include a plurality of to-be-detected objects. The object categories to which different objects in the training image belong may also be referred to as labeled data of the training image, and the labeled data may be (manually) pre-labeled data.

In the foregoing training process, initial knowledge graph information may be first preset (the initial knowledge graph information may be randomly initialized or manually constructed), and then the initial knowledge graph information is continuously adjusted in a process of training the neural network model by using the training data. When a detection result of the training image is relatively close to a labeling result of the training image (or when a quantity of training times reaches a specific level), current knowledge graph information may be used as finally obtained knowledge graph information.

The initial knowledge graph information may include the association relationship between different object categories corresponding to different objects in the to-be-detected image. The association relationship between different object categories corresponding to different objects in the to-be-detected image that is included in the initial knowledge graph information may be randomly set.

With reference to the first aspect, in some implementations of the first aspect, the determining an enhanced image feature of the to-be-detected object based on knowledge graph information includes: performing convolution processing on the semantic information of the object category corresponding to the another object associated with the to-be-detected object in an attention mechanism-based graph convolution manner or a spatial information-based graph sparse convolution manner, to obtain the enhanced image feature of the to-be-detected object.

In this application, when convolution processing is performed in the attention mechanism-based graph convolution manner, the enhanced image feature can be extracted from another object that attracts most attention from each to-be-detected object, so that information reflected by the enhanced image feature is more targeted, and a detection effect of the to-be-detected object is finally improved.

In this application, when convolution processing is performed in the spatial information-based graph sparse convolution manner, the enhanced image feature can be extracted from another object whose spatial distance from the to-be-detected object is within a specific range, so that information reflected by the enhanced image feature is more targeted, and a detection effect of the to-be-detected object is finally improved.

With reference to the first aspect, in some implementations of the first aspect, the method further includes: displaying a detection result of the to-be-detected object, where the detection result of the to-be-detected object includes the candidate frame and the classification of the to-be-detected object.

It is convenient for a user to view a final detection result by displaying the candidate frame and the classification of the to-be-detected object, thereby improving user experience.

Optionally, the displaying a detection result of the to-be-detected object includes: displaying the detection result of the to-be-detected object on a display screen.

The method in the first aspect may be performed by a neural network (model). Specifically, after the to-be-detected image is obtained, convolution processing may be performed on the to-be-detected image by using the neural network, to obtain the initial image feature of the to-be-detected object, the enhanced image feature of the to-be-detected object is determined based on the neural network and the knowledge graph information, and then the candidate frame and the classification of the to-be-detected object are determined based on the initial image feature of the to-be-detected object and the enhanced image feature of the to-be-detected object by using the neural network.

According to a second aspect, a neural network training method is provided. The method includes: obtaining training data, where the training data includes a training image and an object detection labeling result of a to-be-detected object in the training image; extracting an initial image feature of the to-be-detected object in the training image based on a neural network; extracting an enhanced image feature of the to-be-detected object in the training image based on the neural network and knowledge graph information; processing the initial image feature and the enhanced image feature of the to-be-detected object based on the neural network, to obtain an object detection result of the to-be-detected object; and determining model parameters of the neural network based on the object detection result of the to-be-detected object in the training image and the object detection labeling result of the to-be-detected object in the training image.

The knowledge graph information includes an association relationship between object categories corresponding to different objects in the training image, and the enhanced image feature of the to-be-detected object in the training image indicates semantic information of an object category corresponding to another object associated with the to-be-detected object.

The object detection labeling result of the to-be-detected object in the training image includes a labeled candidate frame and a labeled classification result of the to-be-detected object in the training image.

The labeled candidate frame and the labeled classification result may be pre-labeled (specifically, may be manually labeled).

In addition, in the foregoing training process, a plurality of training images are generally used.

When the neural network is trained, a set of initial model parameters may be set for the neural network, and then the model parameters of the neural network are gradually adjusted based on a difference between the object detection result of the to-be-detected object in the training image and the object detection labeling result of the to-be-detected object in the training image, until the difference between the object detection result of the to-be-detected object in the training image and the object detection labeling result of the to-be-detected object in the training image falls within a preset range, or when a quantity of training times reaches a preset quantity, model parameters of the neural network at this time are determined as final parameters of the neural network model. In this way, training of the neural network is completed.

It should be understood that, the neural network trained in the second aspect can be used to perform the method in the first aspect of this application.

In this application, when the neural network is trained, not only the initial image feature of the to-be-detected object in the training image is extracted, but also the enhanced image feature of the to-be-detected object in the training image is extracted, and the object detection result of the to-be-detected object is comprehensively determined based on the initial image feature and the enhanced image feature of the to-be-detected object. In other words, in the training method in this application, more features are extracted in the training process for object detection, so that a neural network with better performance can be trained, and a better object detection effect can be obtained by performing object detection by using the neural network.

With reference to the second aspect, in some implementations of the second aspect, the knowledge graph information is preset.

With reference to the second aspect, in some implementations of the second aspect, the knowledge graph information is obtained by training another neural network model based on training data, where the training data includes a training image and object categories to which different objects in the training image belong.

The another neural network model herein may be different from the neural network model trained in the training method of the second aspect.

With reference to the second aspect, in some implementations of the second aspect, the association relationship between different object categories corresponding to different objects in the training image includes at least one of the following: an attribute association relationship between different object categories; a positional relationship between different object categories; a similarity between word vectors of different object categories; or a probability that different object categories simultaneously occur.

According to a third aspect, an object detection apparatus is provided. The object detection apparatus includes modules configured to perform the method in the first aspect.

According to a fourth aspect, a neural network training apparatus is provided. The apparatus includes modules configured to perform the method in the second aspect.

According to a fifth aspect, an object detection apparatus is provided. The apparatus includes: a memory, configured to store a program; and a processor, configured to execute the program stored in the memory. When the program stored in the memory is executed, the processor is configured to perform the method in the first aspect.

According to a sixth aspect, a neural network training apparatus is provided. The apparatus includes: a memory, configured to store a program; and a processor, configured to execute the program stored in the memory. When the program stored in the memory is executed, the processor is configured to perform the method in the second aspect.

According to a seventh aspect, an electronic device is provided. The electronic device includes the object detection apparatus in the third aspect or the fifth aspect.

According to an eighth aspect, an electronic device is provided. The electronic device includes the object detection apparatus in the fourth aspect or the sixth aspect.

The electronic device may be specifically a mobile terminal (for example, a smartphone), a tablet computer, a notebook computer, an augmented reality/virtual reality device, an in-vehicle terminal device, or the like.

According to a ninth aspect, a computer storage medium is provided. The computer storage medium stores program code, and the program code includes instructions used to perform the steps in the method in the first aspect or the second aspect.

According to a tenth aspect, a computer program product including instructions is provided. When the computer program product runs on a computer, the computer is enabled to perform the method in the first aspect or the second aspect.

According to an eleventh aspect, a chip is provided. The chip includes a processor and a data interface. The processor reads, through the data interface, instructions stored in a memory, to perform the method in the first aspect or the second aspect.

Optionally, in an implementation, the chip may further include the memory. The memory stores the instructions, and the processor is configured to execute the instructions stored in the memory. When executing the instructions, the processor is configured to perform the method in the first aspect.

The chip may be specifically a field programmable gate array (FPGA) or an application-specific integrated circuit (ASIC).

It should be understood that, the method in the first aspect may specifically refer to the method in the first aspect and any implementation in the implementations of the first aspect. The method in the second aspect may specifically refer to the method in the second aspect and any implementation in the implementations of the second aspect.

DESCRIPTION OF EMBODIMENTS

Figure 1:
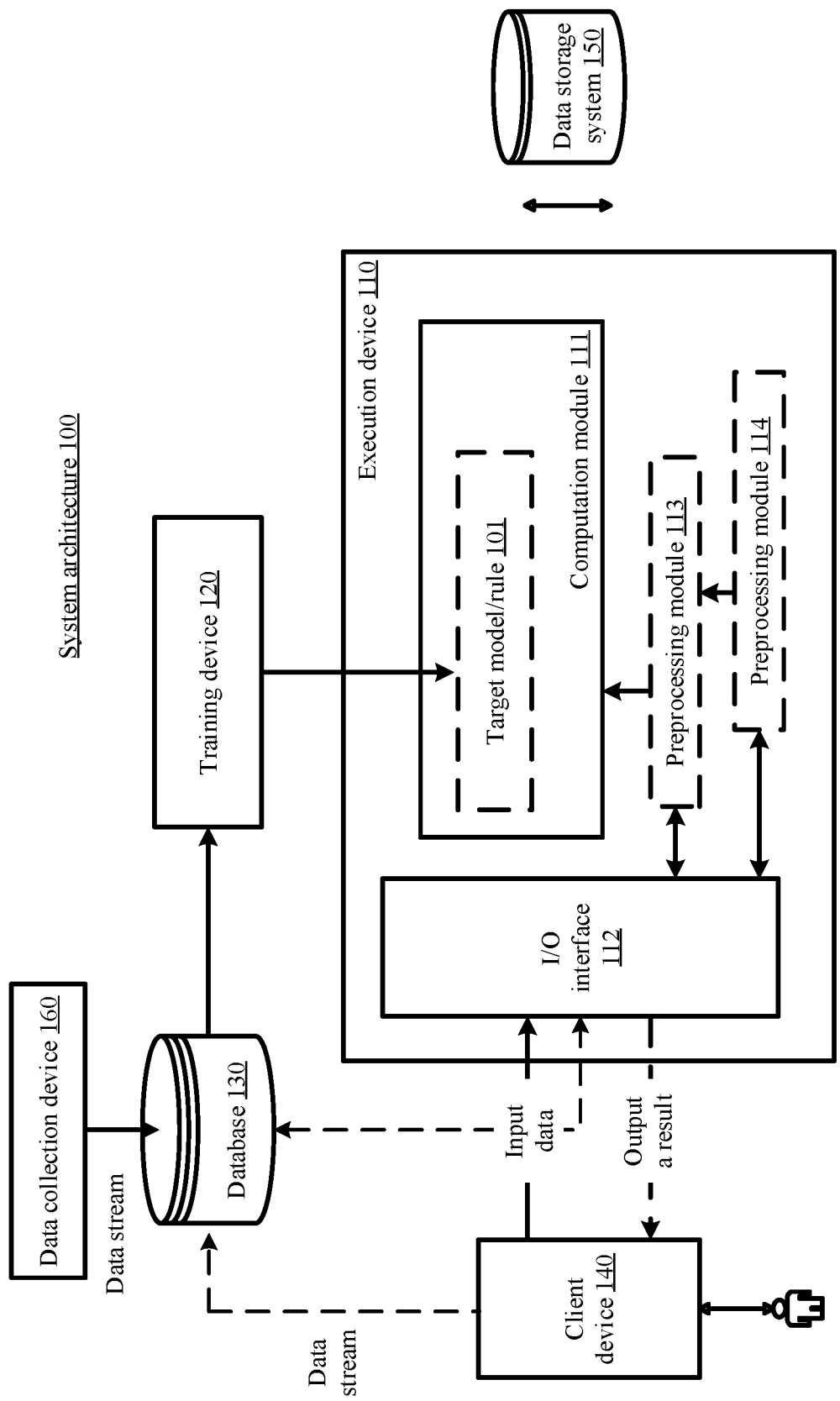
FIG. 1 is a schematic diagram depicting a structure of a system architecture according to an embodiment of this application.

The following describes technical solutions in this application with reference to the accompanying drawings.

Embodiments of this application can be applied to a large-scale object detection scenario, for example, face recognition, identification of everything, object identification by a perception system of an unmanned vehicle, object identification of a picture on a social network site, or object identification by an intelligent robot.

Specifically, an object detection method in the embodiments of this application may be applied to scenarios such as identification of everything by a mobile phone and street view identification. The following briefly describes the two scenarios.

Identification of everything by a mobile phone.

A camera on the mobile phone may be used to shoot a picture that includes various things. After the picture is obtained, a position and a category of each object in the picture can be determined by performing object detection on the picture.

According to the object detection method in the embodiments of this application, object detection can be performed on the picture shot by the mobile phone. In the object detection method in the embodiments of this application, because a knowledge graph is combined when an object is detected, an effect is better (for example, a position of the object and a classification of the object are more accurate) when object detection is performed, by using the object detection method in the embodiments of this application, on the picture shot by the mobile phone.

Street View Identification

A camera deployed on a roadside may take a picture of oncoming vehicles and people. After the picture is obtained, the picture may be uploaded to a control center device. The control center device performs object detection on the picture to obtain an object detection result. When an abnormal object occurs, the control center may give an alarm.

The following describes the method provided in this application from a model training side and a model application side.

A neural network training method provided in the embodiments of this application relates to computer vision processing, and may be specifically applied to data processing methods such as data training, machine learning, and deep learning. Symbolized and formalized intelligent information modeling, extraction, preprocessing, training, and the like are performed on training data (for example, training pictures and labeling results of the training pictures in this application), so that a trained neural network is finally obtained.

In the object detection method provided in the embodiments of this application, input data (for example, pictures in this application) may be input into the trained neural network, to obtain output data (for example, detection results of the pictures in this application). It should be noted that the neural network training method and the object detection method provided in the embodiments of this application are inventions generated based on a same concept, or may be understood as two parts of a system or two stages of an entire process, such as a model training stage and a model application stage.

Because the embodiments of this application relate to applications of a large quantity of neural networks, for ease of understanding, the following first describes related terms and related concepts such as "neural network" in the embodiments of this application.

(1) Neural Network

The neural network may include neurons. The neuron may be an operation unit that uses $x_s$ and an intercept 1 as an input, and an output of the operation unit may be shown in Formula (1):

$$h_{W,b}(x)=f(W^T x)=f(\Sigma_{s=1}^{n} W_s x_s + b) \qquad (1)$$

Herein, s=1, 2, ..., n, n is a natural number greater than 1, $W_s$ represents a weight of $x_s$, b represents a bias of the neuron, and f represents an activation function (activation function) of the neuron, where the activation function is used to introduce a non-linear feature into the neural network, to convert an input signal in the neuron into an output signal. The output signal of the activation function may be used as an input of a next convolutional layer, and the activation function may be a sigmoid function. The neural network is a network constituted by connecting a plurality of single neurons together. To be specific, an output of a neuron may be an input of another neuron. An input of each neuron may be connected to a local receptive field of a previous layer to extract a feature of the local receptive field. The local receptive field may be a region including several neurons.

(2) Deep Neural Network

The deep neural network (deep neural network, DNN), also referred to as a multi-layer neural network, may be understood as a neural network having a plurality of hidden layers. The DNN is divided based on positions of different layers. A neural network inside the DNN may be classified into three types: an input layer, a hidden layer, and an output layer. Generally, the first layer is the input layer, the last layer is the output layer, and the middle layer is the hidden layer. Layers are fully connected. To be specific, any neuron at an $i^{th}$ layer is necessarily connected to any neuron at an $(i+1)^{th}$ layer.

Although the DNN seems complex, the DNN is actually not the case in terms of each layer. The DNN is simply represented as the following linear relationship expression: $\vec{y}=\alpha(W \cdot \vec{x}+\vec{b})$, where $\vec{x}$ represents an input vector, $\vec{y}$ represents an output vector, $\vec{b}$ represents a bias vector, W represents a weight matrix (which is also referred to as a coefficient), and $\alpha(\ )$ represents an activation function. At each layer, the output vector $\vec{x}$ is obtained by performing such a simple operation on the input vector $\vec{y}$. Due to a large quantity of DNN layers, quantities of coefficients W and bias vectors $\vec{b}$ are also large. Definitions of the parameters in the DNN are as follows: The coefficient W is used as an example. It is assumed that in a DNN with three layers, a linear coefficient from the fourth neuron at the second layer to the second neuron at the third layer is defined as $W_{24}^{3}$. The superscript 3 represents a number of a layer at which the coefficient W is located, and subscripts correspond to an index 2 of the third layer for output and an index 4 of the second layer for input.

In conclusion, a coefficient from a $k^{th}$ neuron at an $(L-1)^{th}$ layer to a $j^{th}$ neuron at an $L^{th}$ layer is defined as $W_{jk}^{L}$.

It should be noted that the input layer has no parameter W. In the deep neural network, more hidden layers make the network more capable of describing a complex case in the real world. Theoretically, a model with more parameters has higher complexity and a larger "capacity". It indicates that the model can complete a more complex learning task. Training of the deep neural network is a process of learning a weight matrix, and a final objective of the training is to obtain a weight matrix of all layers of a trained deep neural network (a weight matrix formed by vectors W of many layers).

(3) Convolutional Neural Network

The convolutional neural network (convolutional neuron network, CNN) is a deep neural network with a convolutional structure. The convolutional neural network includes a feature extractor including a convolutional layer and a sub-sampling layer. The feature extractor may be considered as a filter. The convolutional layer is a neuron layer that performs convolution processing on an input signal that is in the convolutional neural network. In the convolutional layer of the convolutional neural network, one neuron may be connected to only a part of neurons at a neighboring layer. A convolutional layer generally includes several feature planes, and each feature plane may include some neurons arranged in a rectangle. Neurons on a same feature plane share a weight, and the shared weight herein is a convolution kernel. Sharing a weight may be understood as that a manner of extracting image information is unrelated to a position. The convolution kernel may be initialized in a form of a matrix of a random size. In a training process of the convolutional neural network, an appropriate weight may be obtained for the convolution kernel through learning. In addition, sharing a weight is advantageous because connections between layers of the convolutional neural network are reduced, and a risk of overfitting is reduced.

(4) Residual Network

The residual network is a deep convolutional network proposed in 2015. Compared with a conventional convolutional neural network, the residual network is easier to optimize and can improve accuracy by increasing a considerable depth. A core of the residual network is to eliminate side effects (a degradation problem) resulting from increasing a depth. In this way, network performance can be improved by simply increasing a network depth. The residual network generally includes many submodules with a same structure. Usually, a quantity of repeated submodules is represented by adding a digit to ResNet, for example, ResNet50 represents that there are 50 submodules in the residual network.

(6) Classifier

Many neural network structures end up with a classifier, for classifying an object in an image. The classifier generally includes a fully connected layer (fully connected layer) and a softmax function, and can output probabilities of different categories based on inputs.

(7) Loss Function

In a process of training a deep neural network, because it is expected that an output of the deep neural network is maximally close to an actually predicted value, a current predicted value of the network may be compared with a target value that is expected, and then a weight vector at each layer of the neural network is updated based on a difference between the current predicted value and the target value (there is usually an initialization process before the first update, that is, a parameter is preconfigured for each layer of the deep neural network). For example, if the predicted value of the network is large, the weight vector is adjusted to lower the predicted value until the deep neural network can predict the target value that is actually expected or a value close to the target value that is actually expected. Therefore, "how to obtain, through comparison, the difference between the predicted value and the target value" needs to be predefined. This is the loss function (loss function) or an objective function (objective function). The loss function and the objective function are important equations used to measure the difference between the predicted value and the target value. The loss function is used as an example. A higher output value (loss) of the loss function indicates a larger difference. Therefore, training of the deep neural network is a process of minimizing the loss.

(8) Back Propagation Algorithm

In a training process, a neural network may correct values of parameters in an initial neural network model by using an error back propagation (back propagation, BP) algorithm, so that a reconstruction error loss of the neural network model becomes increasingly smaller. Specifically, an input signal is forward transferred until an error loss occurs in output, and the parameters in the initial neural network model are updated based on back propagation error loss information, so that the error loss is reduced. The back propagation algorithm is a back propagation motion mainly dependent on the error loss, and aims to obtain parameters of an optimal neural network model, for example, a weight matrix.

The foregoing briefly describes some basic content of the neural network, and the following describes some specific neural networks that may be used in image data processing.

(9) Graph Convolutional Neural Network

A graph (graph) is a data format that may be used to represent a social network, a communications network, a protein molecular network, or the like. A node in the graph represents an individual in a network, and a connection line represents a connection relationship between individuals. Many machine learning tasks such as community detection and link prediction need to use graph structure data. Therefore, emergence of the graph convolutional network (graph convolutional network, GCN) provides a new idea for resolving these problems. Deep learning can be performed on graph data by using the GCN.

The GCN is a natural extension of the convolutional neural network in a graph domain (graph domain). The GCN can simultaneously perform peer-to-peer learning on node feature information and structure information, and is currently an optimal choice for a graph data learning task. The GCN has extremely broad applicability, and is applicable to a node and a graph of any topological structure.

The following describes in detail a system architecture in an embodiment of this application with reference to FIG. 1.

FIG. 1 is a schematic diagram of a system architecture according to an embodiment of this application. As shown in FIG. 1, the system architecture 100 includes an execution device 110, a training device 120, a database 130, a client device 140, a data storage system 150, and a data collection device 160.

In addition, the execution device 110 includes a computation module 111, an I/O interface 112, a preprocessing module 113, and a preprocessing module 114. The computation module 111 may include a target model/rule 101, and the preprocessing module 113 and the preprocessing module 114 are optional.

The data collection device 160 is configured to collect training data. For the object detection method in the embodiments of this application, the training data may include a training image and a labeling result corresponding to the training image, where the labeling result of the training image may be (manually) pre-labeled classification results of to-be-detected objects in the training image. After collecting the training data, the data collection device 160 stores the training data in the database 130, and the training device 120 obtains the target model/rule 101 through training based on the training data maintained in the database 130.

The following describes a process in which the training device 120 obtains the target model/rule 101 based on the training data. The training device 120 performs object detection on an input training image, and compares an output object detection result with a pre-labeled detection result, until a difference between the object detection result output by the training device 120 and the pre-labeled detection result is less than a specific threshold, thereby completing training of the target model/rule 101.

The target model/rule 101 can be used to implement the object detection method in the embodiments of this application, that is, a to-be-detected image (obtained through related preprocessing) is input into the target model/rule 101, to obtain a detection result of the to-be-detected image. The target model/rule 101 in this embodiment of this application may be specifically a neural network. It should be noted that, in actual application, the training data maintained in the database 130 may not all be collected by the data collection device 160, or may be received or obtained from another device. It should be further noted that the training device 120 may not necessarily train the target model/rule 101 completely based on the training data maintained in the database 130, or may obtain training data from a cloud or another place to perform model training. The foregoing description should not be construed as a limitation on the embodiments of this application.

The target model/rule 101 obtained through training by the training device 120 may be applied to different systems or devices, for example, the execution device 110 shown in FIG. 1. The execution device 110 may be a terminal, for example, a mobile phone, a tablet, a laptop computer, an augmented reality (augmented reality, AR)/virtual reality (virtual reality, VR) terminal, or a vehicle-mounted terminal, or may be a server, a cloud, or the like. In FIG. 1, the execution device 110 is provided with the input/output (input/output, I/O) interface 112, and is configured to exchange data with an external device. A user may input data to the I/O interface 112 by using the client device 140. The input data in this embodiment of this application may include a to-be-detected image input by using the client device. The client device 140 herein may be specifically a terminal device.

The preprocessing module 113 and the preprocessing module 114 are configured to perform preprocessing based on the input data (for example, the to-be-detected image) received by the I/O interface 112. In this embodiment of this application, the preprocessing module 113 and the preprocessing module 114 may not be included (or only one of the preprocessing module 113 and the preprocessing module 114 is included). The computation module 111 is directly configured to process the input data.

In a process in which the execution device 110 performs preprocessing on the input data or the computation module 111 of the execution device 110 performs related processing such as computation, the execution device 110 may invoke data, code, and the like in the data storage system 150 for corresponding processing, and may also store data, instructions, and the like obtained through corresponding processing into the data storage system 150.

Finally, the I/O interface 112 returns a processing result, such as the foregoing obtained object detection result, to the client device 140, to provide the processing result for the user.

It should be noted that the training device 120 may generate corresponding target models/rules 101 for different targets or different tasks based on different training data. The corresponding target models/rules 101 may be used to implement the foregoing targets or complete the foregoing tasks, to provide a desired result for the user.

In a case shown in FIG. 1, the user may manually provide the input data. The manually providing may be performed by using a screen provided on the I/O interface 112. In another case, the client device 140 may automatically send input data to the I/O interface 112. If it is required that the client device 140 needs to obtain authorization from the user to automatically send the input data, the user may set corresponding permission on the client device 140. The user may view, on the client device 140, a result output by the execution device 110. Specifically, the result may be presented in a form of displaying, a sound, an action, or the like. The client device 140 may alternatively serve as a data collection end to collect, as new sample data, the input data input into the I/O interface 112 and the output result output from the I/O interface 112 that are shown in the figure, and store the new sample data into the database 130. Certainly, the client device 140 may alternatively not perform collection, but the I/O interface 112 directly stores, as new sample data into the database 130, input data input into the I/O interface 112 and an output result output from the I/O interface 112 that are shown in the figure.

It should be noted that FIG. 1 is merely a schematic diagram of a system architecture according to this embodiment of this application. A location relationship between the devices, the components, the modules, and the like shown in the figure does not constitute any limitation. For example, in FIG. 1, the data storage system 150 is an external memory relative to the execution device 110; in another case, the data storage system 150 may alternatively be disposed in the execution device 110.

As shown in FIG. 1, the target model/rule 101 trained by the training device 120 in this embodiment of this application may be a neural network in this application. Specifically, the neural network provided in this embodiment of this application may be a CNN, a deep convolutional neural network (deep convolutional neural network, DCNN), or the like.

Because the CNN is a very common neural network, a structure of the CNN is mainly described in detail below with reference to FIG. 2. As described in the foregoing description of basic concepts, the convolutional neural network is a deep neural network with a convolutional structure, and is a deep learning (deep learning) architecture. The deep learning architecture is to perform multi-level learning at different abstract levels according to a machine learning algorithm. As a deep learning architecture, the CNN is a feed-forward (feed-forward) artificial neural network, and each neuron in the feed-forward artificial neural network can respond to an image input into the feed-forward artificial neural network.

Figure 2:
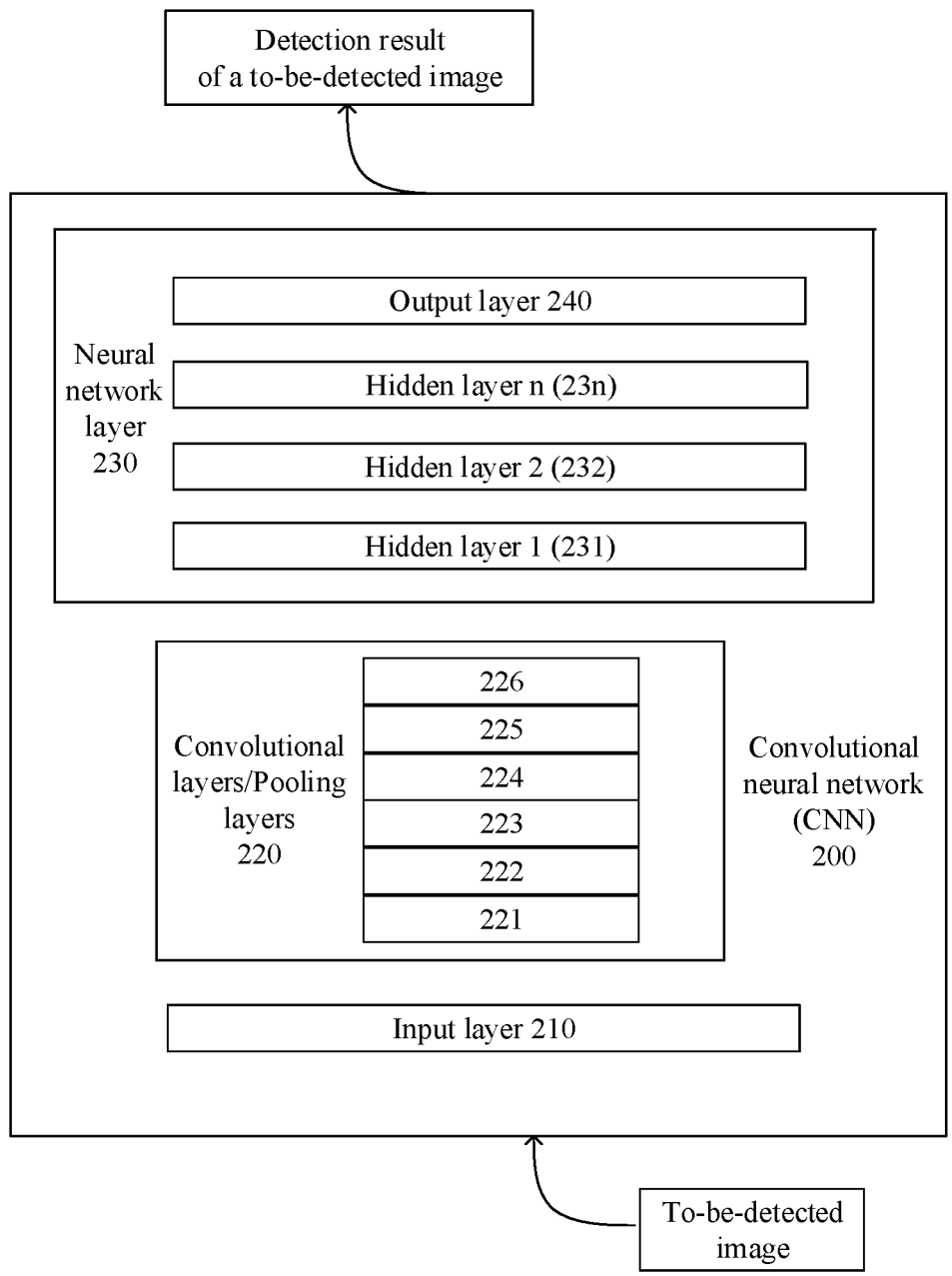
FIG. 2 is a schematic diagram of performing object detection by using a convolutional neural network model according to an embodiment of this application.

As shown in FIG. 2, the convolutional neural network (CNN) 200 may include an input layer 210, convolutional layers/pooling layers 220 (where the pooling layer is optional), and a neural network layer 230. The following describes related content of these layers in detail.

Convolutional Layers/Pooling Layers 220
Convolutional Layer

As shown in FIG. 2, the convolutional layers/pooling layers 220 may include example layers 221 to 226. For example, in an implementation, the layer 221 is a convolutional layer, the layer 222 is a pooling layer, the layer 223 is a convolutional layer, the layer 224 is a pooling layer, the layer 225 is a convolutional layer, and the layer 226 is a pooling layer. In another implementation, the layers 221 and 222 are convolutional layers, the layer 223 is a pooling layer, the layers 224 and 225 are convolutional layers, and the layer 226 is a pooling layer. In other words, an output of a convolutional layer may be used as an input for a subsequent pooling layer, or may be used as an input for another convolutional layer, to continue to perform a convolution operation.

The following describes internal working principles of the convolutional layer by using the convolutional layer 221 as an example.

The convolutional layer 221 may include a plurality of convolution operators. The convolution operator is also referred to as a kernel. In image processing, the convolution operator functions as a filter that extracts specific information from an input image matrix. The convolution operator may essentially be a weight matrix, and the weight matrix is usually predefined. In a process of performing a convolution operation on an image, the weight matrix usually processes pixels at a granularity of one pixel (or two pixels, depending on a value of a stride (stride)) in a horizontal direction on an input image, to extract a specific feature from the image. A size of the weight matrix should be related to a size of the image. It should be noted that a depth dimension (depth dimension) of the weight matrix is the same as a depth dimension of the input image. During a convolution operation, the weight matrix extends to an entire depth of the input image. Therefore, a convolutional output of a single depth dimension is generated through convolution with a single weight matrix. However, in most cases, a single weight matrix is not used, but a plurality of weight matrices with a same size (rows x columns), namely, a plurality of same-type matrices, are applied. Outputs of the weight matrices are superimposed to form a depth dimension of a convolutional image. The dimension herein may be understood as being determined based on the foregoing "plurality". Different weight matrices may be used to extract different features from the image. For example, one weight matrix is used to extract edge information of the image, another weight matrix is used to extract a specific color of the image, and a further weight matrix is used to blur unneeded noise in the image. The plurality of weight matrices have the same size (rows×columns), and convolutional feature graphs extracted from the plurality of weight matrices with the same size have a same size. Then, the plurality of extracted convolutional feature graphs with the same size are combined to form an output of the convolution operation.

Weight values in these weight matrices need to be obtained through a lot of training during actual application. Each weight matrix formed by using the weight values obtained through training may be used to extract information from an input image, to enable the convolutional neural network 200 to perform correct prediction.

When the convolutional neural network 200 has a plurality of convolutional layers, an initial convolutional layer (for example, the layer 221) usually extracts more general features, where the general features may also be referred to as lower-level features. As a depth of the convolutional neural network 200 increases, a deeper convolutional layer (for example, the layer 226) extracts more complex features, such as higher-level semantic features. Higher-level semantic features are more applicable to a problem to be resolved.
Pooling Layer A quantity of training parameters often needs to be reduced. Therefore, a pooling layer often needs to be periodically introduced after a convolutional layer. For the layers 221 to 226 shown in the convolutional layers/pooling layers 220 in FIG. 2, one convolutional layer may be followed by one pooling layer, or a plurality of convolutional layers may be followed by one or more pooling layers. During image processing, the pooling layer is only used to reduce a space size of the image. The pooling layer may include an average pooling operator and/or a maximum pooling operator, to perform sampling on the input image to obtain an image with a relatively small size. The average pooling operator may be used to calculate pixel values in the image within a specific range, to generate an average value. The average value is used as an average pooling result. The maximum pooling operator may be used to select a pixel with a maximum value within a specific range as a maximum pooling result. In addition, similar to that the size of the weight matrix at the convolutional layer needs to be related to the size of the image, an operator at the pooling layer also needs to be related to the size of the image. A size of a processed image output from the pooling layer may be less than a size of an image input to the pooling layer. Each pixel in the image output from the pooling layer represents an average value or a maximum value of a corresponding sub-region of the image input to the pooling layer.
Neural Network Layer 230

After processing is performed by the convolutional layers/pooling layers 220, the convolutional neural network 200 still cannot output required output information. As described above, at the convolutional layers/pooling layers 220, only a feature is extracted, and parameters resulting from an input image are reduced. However, to generate final output information (required class information or other related information), the convolutional neural network 200 needs to use the neural network layer 230 to generate an output of one required class or outputs of a group of required classes. Therefore, the neural network layer 230 may include a plurality of hidden layers (hidden layers 231, 232, . . . , and 23n shown in FIG. 2) and an output layer 240. Parameters included in the plurality of hidden layers may be obtained through pre-training based on related training data of a specific task type. For example, the task type may include image recognition, image classification, and super-resolution image reconstruction.

At the neural network layer 230, the plurality of hidden layers are followed by the output layer 240, namely, the last layer of the entire convolutional neural network 200. The output layer 240 has a loss function similar to a categorical cross entropy, and the loss function is specifically used to calculate a prediction error. Once forward propagation (propagation in a direction from the input layer 210 to the output layer 240, as shown in FIG. 2) of the entire convolutional neural network 200 is completed, reverse propagation (propagation in a direction from the output layer 240 to the input layer 210, as shown in FIG. 2) is started to update a weight value and a deviation of each layer mentioned above, to reduce a loss of the convolutional neural network 200 and an error between a result output by the convolutional neural network 200 by using the output layer and an ideal result.

It should be noted that the convolutional neural network 200 shown in FIG. 2 is merely an example convolutional neural network. In specific application, the convolutional neural network may alternatively exist in a form of another network model.

It should be understood that, the object detection method in the embodiments of this application may be performed by using the convolutional neural network (CNN) 200 shown in FIG. 2. As shown in FIG. 2, after a to-be-detected image is processed by the input layer 210, the convolutional layers/pooling layers 220, and the neural network layer 230, a detection result of the image may be obtained.

Figure 3:
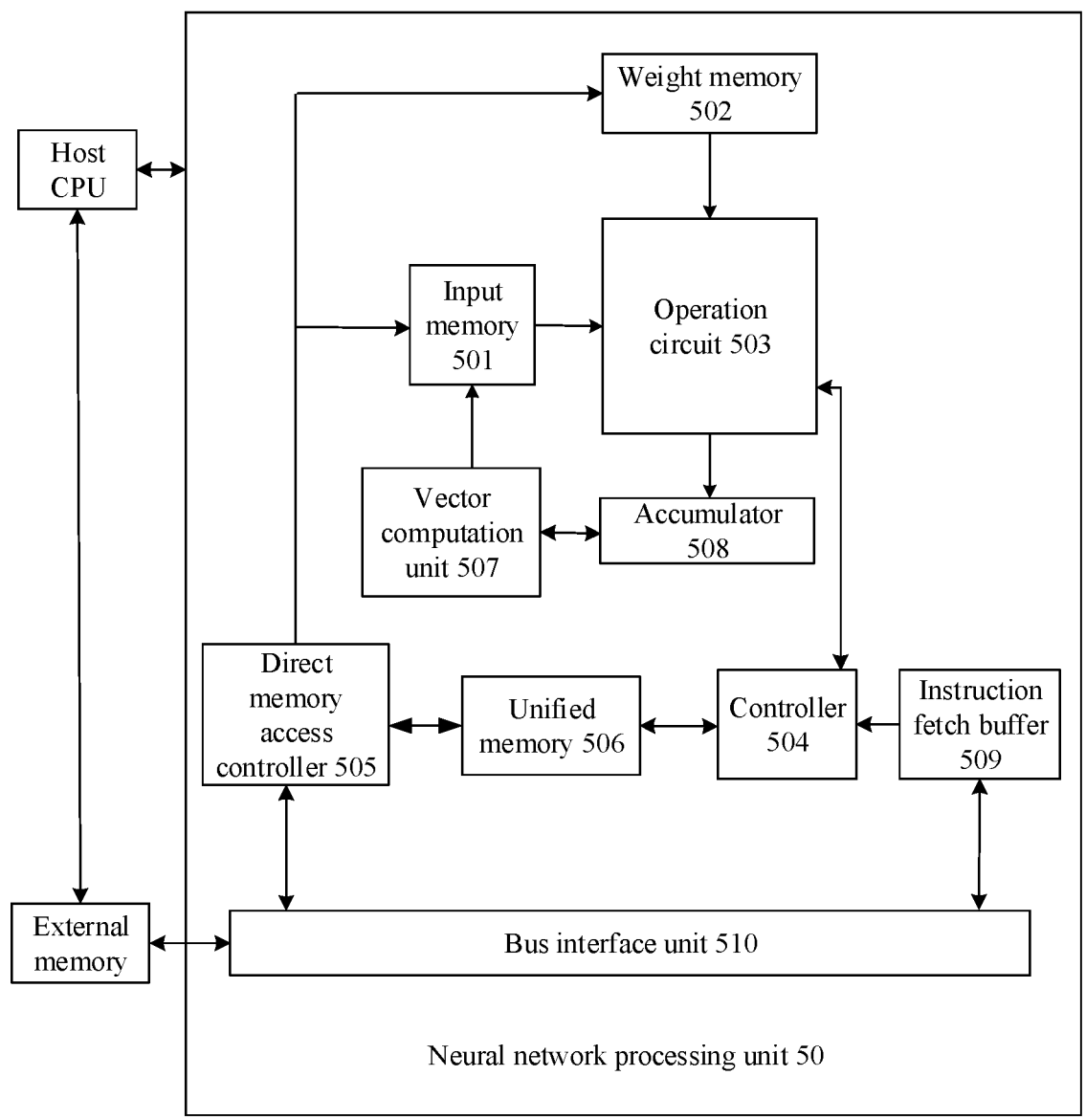
FIG. 3 is a schematic diagram of a hardware structure of a chip according to an embodiment of this application.

FIG. 3 shows a hardware structure of a chip according to an embodiment of this application, and the chip includes a neural network processing unit 50. The chip may be disposed in the execution device 110 shown in FIG. 1, to complete computation work of the computation module 111. The chip may alternatively be disposed in the training device 120 shown in FIG. 1, to complete training work of the training device 120 and output the target model/rule 101. All algorithms of the layers in the convolutional neural network shown in FIG. 2 may be implemented in the chip shown in FIG. 3.

The neural network processing unit (NPU) 50 serves as a coprocessor, and may be disposed on a host central processing unit (central processing unit, CPU) (host CPU). The host CPU assigns a task. A core part of the NPU is an operation circuit 503, and a controller 504 controls the operation circuit 503 to extract data from a memory (a weight memory or an input memory) and perform an operation.

In some implementations, the operation circuit 503 includes a plurality of processing units (process engine, PE) inside. In some implementations, the operation circuit 503 is a two-dimensional systolic array. The operation circuit 503 may alternatively be a one-dimensional systolic array or another electronic circuit capable of performing mathematical operations such as multiplication and addition. In some implementations, the operation circuit 503 is a general-purpose matrix processor.

For example, it is assumed that there are an input matrix A, a weight matrix B, and an output matrix C. The operation circuit 503 fetches data corresponding to the matrix B from the weight memory 502 and buffers the data in each PE of the operation circuit 503. The operation circuit 503 fetches data of the matrix A from an input memory 501, to perform a matrix operation on the matrix B, and stores an obtained partial result or an obtained final result of the matrix into an accumulator (accumulator) 508.

A vector computation unit 507 may perform further processing such as vector multiplication, vector addition, an exponent operation, a logarithm operation, or value comparison on an output of the operation circuit 503. For example, the vector computation unit 507 may be configured to perform network calculation, such as pooling (pooling), batch normalization (batch normalization), or local response normalization (local response normalization) at a non-convolutional/non-FC layer in a neural network.

In some implementations, the vector computation unit 507 can store a processed output vector in a unified cache 506. For example, the vector computation unit 507 can apply a non-linear function to an output of the operation circuit 503, for example, a vector of an accumulated value, used to generate an activated value. In some implementations, the vector computation unit 507 generates a normalized value, a combined value, or both a normalized value and a combined value. In some implementations, the processed output vector can be used as an activated input to the operation circuit 503, for example, the processed output vector can be used at a subsequent layer of the neural network.

The unified memory 506 is configured to store input data and output data.

For weight data, a direct memory access controller (direct memory access controller, DMAC) 505 directly transfers input data in an external memory to the input memory 501 and/or the unified memory 506, stores weight data in the external memory in the weight memory 502, and stores data in the unified memory 506 in the external memory.

A bus interface unit (bus interface unit, BIU) 510 is configured to implement interaction between the host CPU, the DMAC, and an instruction fetch buffer 509 through a bus.

The instruction fetch buffer (instruction fetch buffer) 509 connected to the controller 504 is configured to store instructions used by the controller 504.

The controller 504 is configured to invoke the instructions cached in the instruction fetch buffer 509, to control a working process of an operation accelerator.

Entry: Data herein may be described as description data according to an actual invention, for example, a detected vehicle speed, a distance to an obstacle, and the like.

Usually, the unified memory 506, the input memory 501, the weight memory 502, and the instruction fetch buffer 509 each are an on-chip (On-Chip) memory. The external memory is a memory outside the NPU. The external memory may be a double data rate synchronous dynamic random access memory (double data rate synchronous dynamic random access memory, DDR SDRAM for short), a high bandwidth memory (high bandwidth memory, HBM), or another readable and writable memory.

Operation at each layer in the convolutional neural network shown in FIG. 2 may be performed by the operation circuit or the vector computation unit 307.

The execution device 110 in FIG. 1 described above can perform the steps of the object detection method in the embodiments of this application. The CNN model shown in FIG. 2 and the chip shown in FIG. 3 may also be configured to perform the steps of the object detection method in the embodiments of this application. The following describes in detail the object detection method in the embodiments of this application with reference to the accompanying drawings.

Figure 4:
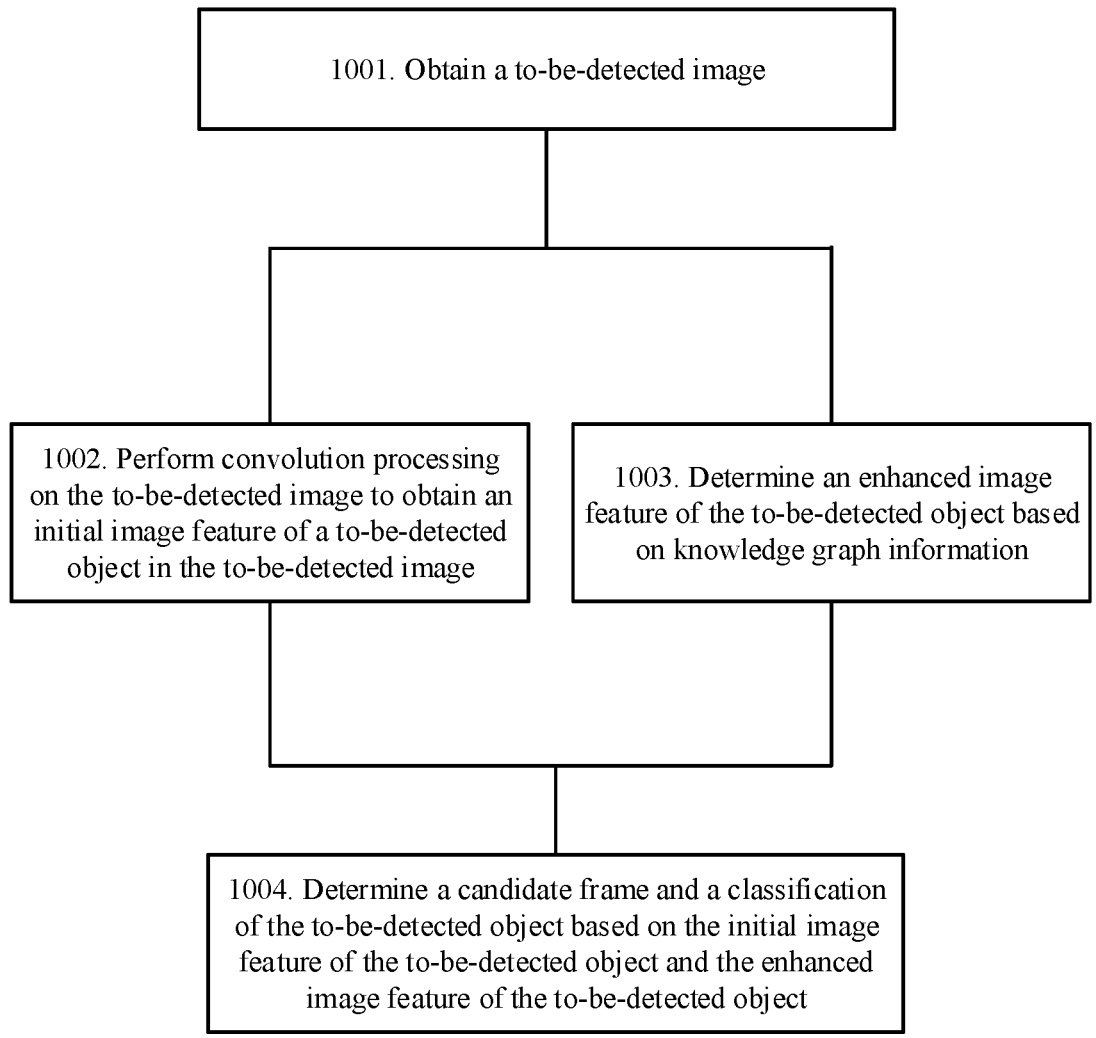
FIG. 4 is a schematic flowchart of an object detection method according to an embodiment of this application.

The following describes in detail the object detection method in the embodiments of this application with reference to FIG. 4.

The method shown in FIG. 4 may be performed by an object detection apparatus, and the object detection apparatus may be an electronic device having an object detection function. The electronic device may be specifically a mobile terminal (for example, a smartphone), a computer, a personal digital assistant, a wearable device, an augmented reality/virtual reality device, a vehicle-mounted device, an Internet of Things device, or another device that can perform object detection.

The method shown in FIG. 4 includes step 1001 to step 1004. The following describes these steps in detail.

1001. Obtain a to-be-detected image.

The method shown in FIG. 4 may be applied to different scenarios. Specifically, the method shown in FIG. 4 may be applied to scenarios such as identification of everything and street view identification.

When the method shown in FIG. 4 is applied to the scenario in which everything is identified by using a mobile terminal, the to-be-detected image in step 1001 may be an image shot by a camera of the mobile terminal, or may be an image already stored in an album of the mobile terminal.

When the method shown in FIG. 4 is applied to the street view identification scenario, the to-be-detected image in step 1001 may be a street view image shot by a camera on a roadside.

The method shown in FIG. 4 may be performed by a neural network (model). Specifically, the method shown in FIG. 4 may be performed by a CNN or a DNN.

1002. Perform convolution processing on the to-be-detected image to obtain an initial image feature of a to-be-detected object.

In step 1002, convolution processing may be first performed on the entire to-be-detected image to obtain an image feature of the entire image, and then the initial image feature corresponding to the to-be-detected object is obtained from the image feature of the entire image.

Optionally, the performing convolution processing on the to-be-detected image to obtain an initial image feature of a to-be-detected object includes: performing convolution processing on the entire to-be-detected image to obtain a complete image feature of the to-be-detected image; and determining an image feature that is in the complete image feature of the to-be-detected image and that corresponds to the to-be-detected object as the initial image feature of the to-be-detected object.

In this application, convolution processing is first performed on the entire to-be-detected image to obtain the complete image feature of the to-be-detected image, and then the image feature corresponding to the to-be-detected object is obtained from the complete image feature of the to-be-detected image. Compared with a manner of separately obtaining an image feature corresponding to each to-be-detected object each time, this manner of obtaining the image feature of the to-be-detected object can reduce complexity of obtaining the image feature of the to-be-detected object.

1003. Determine an enhanced image feature of the to-be-detected object based on knowledge graph information.

The knowledge graph information includes association relationships between different object categories corresponding to different objects in the to-be-detected image, and the enhanced image feature of the to-be-detected object indicates semantic information of an object category corresponding to another object associated with the to-be-detected object.

The semantic information may refer to high-level information that can assist in image detection. For example, the semantic information may be specifically what an object is and what is around the object (the semantic information is generally different from low-level information, for example, an edge, a pixel, and brightness of an image).

For example, if the to-be-detected object is a bicycle, and other objects associated with the bicycle in the to-be-detected image include a person and a road, the enhanced image feature of the to-be-detected object may indicate semantic information of the person and the road.

The knowledge graph information may be preset, or may be obtained by training the neural network model based on training data.

Specifically, the knowledge graph information may be preset based on experience. For example, the knowledge graph information may be set or generated based on an association relationship between objects of different categories manually labeled.

For example, the knowledge graph information may be determined by manually counting similarities between objects of different categories and a probability that objects of different categories simultaneously occur.

In addition, when the knowledge graph information is obtained by training the neural network model based on the training data, the training data includes a training image and object categories to which different objects in the training image belong.

The training image may generally include a plurality of to-be-detected objects. The object categories to which different objects in the training image belong may also be referred to as labeled data of the training image, and the labeled data may be (manually) pre-labeled data.

In the foregoing training process, initial knowledge graph information may be first preset (the initial knowledge graph information may be randomly initialized or manually constructed), and then the initial knowledge graph information is continuously adjusted in a process of training the neural network model by using the training data. When a detection result of the training image is close to a labeling result of the training image (or when a quantity of training times reaches a specific level), current knowledge graph information may be used as finally obtained knowledge graph information.

The initial knowledge graph information may include the association relationship between different object categories corresponding to different objects in the to-be-detected image. The association relationship between different object categories corresponding to different objects in the to-be-detected image that is included in the initial knowledge graph information may be randomly set.

The knowledge graph information may include the association relationship between different object categories corresponding to different objects in the to-be-detected image, and the association relationship between different object categories corresponding to different objects in the to-be-detected image may include at least one of the following: an attribute association relationship between different object categories; a positional relationship between different object categories; a similarity between word vectors of different object categories; or a probability that different object categories simultaneously occur.

Specifically, the attribute association relationship between different object categories may refer to whether objects of different categories have a same attribute.

For example, if a color of an apple is red, and a color of a strawberry is also red, the apple and the strawberry have a same color attribute (in other words, the apple and the strawberry are close in the color attribute).

The knowledge graph information may be represented by using a table. For example, the knowledge graph information may be in a form shown in Table 1.

TABLE 1

|  | Knife | Spoon | Bowl | Banana | Apple |
| --- | --- | --- | --- | --- | --- |
| Knife | 1 | 0.016 | 0.094 | 0.094 | 0 |
| Spoon | 0.016 | 1 | 0 | 0 | 0.21 |
| Bowl | 0.094 | 0 | 1 | 0 | 0 |
| Banana | 0.094 | 0 | 0 | 1 | 0 |
| Apple | 0 | 0.21 | 0 | 0 | 1 |

Table 1 shows similarities among a knife (knife), a spoon (spoon), a bowl (bowl), a banana (banana), and an apple (apple). A value in the table is a similarity value between different objects. A larger similarity value indicates a higher similarity between two corresponding objects. For example, a similarity value between the spoon and the knife is 0.016, and a similarity value between the bowl and the spoon is 0.094, it indicates that a similarity between the bowl and the spoon is higher.

In addition, when a similarity value between objects is 1, it indicates that the two objects are completely the same. In this case, the two objects may be considered as a same object. For example, a similarity value between knives is 1, and a similarity value between spoons is also 1.

It should be understood that, Table 1 is merely an example for describing a possible representation form of the knowledge graph information, and the knowledge graph information may further directly include association relationship information between associated objects. This is not limited in this application.

Certainly, categories of the objects of different categories shown in Table 1 may be further divided depending on actual requirements. For example, the spoon in Table 1 may be further divided as a long spoon, a short spoon, a soup spoon, or the like.

Optionally, the determining an enhanced image feature of the to-be-detected object based on knowledge graph information in step 1003 includes: determining graph structure information based on the knowledge graph information and memory pool information; and determining the enhanced image feature of the to-be-detected object based on the graph structure information.

The graph structure information may include a plurality of nodes, where each node corresponds to one object, a node corresponding to each object is connected to a node corresponding to another object associated with the object, the plurality of nodes include the to-be-detected object and the another object associated with the to-be-detected object, and each node includes semantic information of a corresponding object.

When the enhanced image feature of the to-be-detected object is determined based on the graph structure information, the to-be-detected object may be specifically determined based on the graph structure information, and then semantic information of a node (namely, the another object associated with the to-be-detected object) connected around the to-be-detected object is extracted to obtain the enhanced image feature.

In addition, the graph structure information may be specifically generated based on a type of an object category included in the memory pool information and association relationships between objects of various categories included in the knowledge graph information.

For example, the knowledge graph information includes association relationships among 1000 object categories, and the memory pool information includes classification layer parameters of 100 object categories. In this case, association relationships among the 100 object categories recorded in the memory pool information may be obtained from the knowledge graph information, and a graph structure including 100 categories is constructed based on the association relationships among the 100 object categories.

Figure 5:
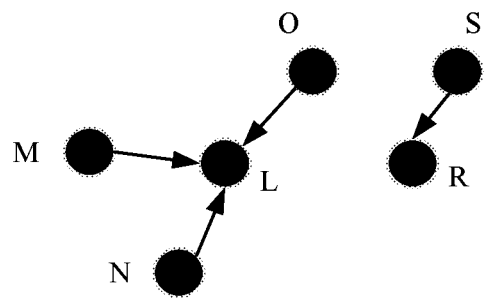
FIG. 5 is a schematic diagram of a graph structure according to an embodiment of this application.

For example, FIG. 5 shows a schematic diagram of the graph structure. In FIG. 5, each node corresponds to a different object, where a node L corresponds to the to-be-detected object, objects corresponding to a node M, a node N, and a node O are objects that are associated with the to-be-detected object in the to-be-detected image, and a node R and a node S are objects that are not related to the to-be-detected object in the graph structure. Therefore, the enhanced image feature of the to-be-detected object may be obtained by extracting semantic information of the node M, the node N, and the node O.

1004. Determine a candidate frame and a classification of the to-be-detected object based on the initial image feature of the to-be-detected object and the enhanced image feature of the to-be-detected object.

The candidate frame and the classification of the to-be-detected object determined in step 1004 may be a final candidate frame and a final classification (result) of the to-be-detected object, respectively.

In step 1004, the initial image feature of the to-be-detected object and the enhanced image feature of the to-be-detected object may be first combined to obtain a final image feature of the to-be-detected object, and then the candidate frame and the classification of the to-be-detected object are determined based on the final image feature of the to-be-detected object.

For example, the initial image feature of the to-be-detected object is a convolution feature graph whose size is $M1 \times N1 \times C1$ (M1, N1, and C1 may respectively represent a width, a height, and a channel quantity), and the enhanced image feature of the to-be-detected object is a convolution feature graph whose size is $M1 \times N1 \times C2$ (M1, N1, and C2 respectively represent a width, a height, and a channel quantity). Therefore, the final image feature of the to-be-detected object may be obtained by combining the two convolution feature graphs, and the final image feature is a convolution feature graph whose size is $M1 \times N1 \times (C1+C2)$.

It should be understood that, description is performed herein by using an example in which the size of the convolution feature graph of the initial image feature and the size of the convolution feature graph of the enhanced image feature are the same (the widths are the same and the heights are the same), but the channel quantities are different. Actually, when the size of the convolution feature graph of the initial image feature and the size of the convolution feature graph of the enhanced image feature are different, the initial image feature and the enhanced image feature may also be combined. In this case, the size of the convolution feature graph of the initial image feature and the size of the convolution feature graph of the enhanced image feature may be unified (the widths are unified and the heights are unified) first, and then the convolution feature graph of the initial image feature and the convolution feature graph of the enhanced image feature are combined, to obtain the convolution feature graph of the final image feature.

In this application, when object detection is performed on the to-be-detected image, a detection result of the to-be-detected object is comprehensively determined based on the initial image feature and the enhanced image feature of the to-be-detected object. Therefore, this manner can be used to obtain a better detection result, compared with a manner of obtaining the detection result by considering only the initial image feature of the to-be-detected object.

Specifically, in this application, when the detection result of the to-be-detected object is determined, not only the initial image feature reflecting a feature of the to-be-detected object is considered, but also the semantic information of the another object associated with the to-be-detected object in the to-be-detected image is considered. In this application, the detection result of the to-be-detected object is comprehensively determined by combining the feature of the to-be-detected object and a feature of the associated another object, thereby improving accuracy of the detection result of the to-be-detected object to some extent.

For example, there is a to-be-detected first object in the to-be-detected image, and objects associated with the first object in the to-be-detected image include a road and a person. In this case, a detection result of the first object may be determined by comprehensively considering an initial image feature extracted from the first object and semantic information of the person and the road. It is assumed that an initial classification result of the first object is a bicycle. Because there is a high possibility that the person and the road occur simultaneously with the bicycle, confidence that the first object is a bicycle can be increased by using the semantic information of the person and the road, thereby finally improving accuracy of the detection result of the first object.

In step 1003, the determining an enhanced image feature of the to-be-detected object based on knowledge graph information specifically includes: performing convolution processing on the semantic information of the object category corresponding to the another object associated with the to-be-detected object in an attention mechanism-based graph convolution manner, to obtain the enhanced image feature of the to-be-detected object.

In this application, when convolution processing is performed in the attention mechanism-based graph convolution manner, the enhanced image feature can be extracted from another object that attracts most attention from each to-be-detected object, so that information reflected by the enhanced image feature is more targeted, and a detection effect of the to-be-detected object is finally improved.

In addition to performing convolution processing in the attention mechanism-based graph convolution manner, convolution processing may alternatively be performed in a spatial information-based graph sparse convolution manner.

In step 1003, the determining an enhanced image feature of the to-be-detected object based on knowledge graph information specifically includes: performing convolution processing on the semantic information of the object category corresponding to the another object in the spatial information-based graph sparse convolution manner, to obtain the enhanced image feature of the to-be-detected object.

Optionally, before step 1004, the method shown in FIG. 4 further includes: determining an initial candidate frame and an initial classification of the to-be-detected object based on the initial image feature of the to-be-detected object.

In a process of determining the initial candidate frame and the initial classification of the to-be-detected object, convolution processing is generally first performed on the entire to-be-detected image to obtain a convolution feature of the entire to-be-detected image; and then the to-be-detected image is divided into different square frames based on a fixed-size requirement, a feature corresponding to an image in each square frame is scored, a square frame with a higher score is selected as the initial candidate frame, and an initial classification of an image corresponding to the initial candidate frame is determined based on an image feature corresponding to the initial candidate frame.

For example, the to-be-detected image is a first image. To obtain an initial candidate frame and an initial classification of a to-be-detected object in the first image, convolution processing may be first performed on the entire first image to obtain a convolution feature of the entire image of the first image; and then the first image is divided into 3×3 square frames, and a feature corresponding to an image in each square frame is scored. Finally, a square frame A and a square frame B that each have a higher score may be selected as initial candidate frames; and then an initial classification of an image in the square frame A is determined based on a feature corresponding to the image in the square frame A, and an initial classification of an image in the square frame B is determined based on a feature corresponding to the image in the square frame B.

In step 1004, in a process of determining the candidate frame and the classification of the to-be-detected object based on the initial image feature of the to-be-detected object and the enhanced image feature of the to-be-detected object, the initial image feature and the enhanced image feature may be combined first to obtain the final image feature, then the initial candidate frame is adjusted based on the final image feature to obtain the candidate frame, and an initial classification result is corrected based on the final image feature to obtain a classification result. Specifically, adjusting the initial candidate frame based on the final image feature may be: adjusting coordinates around the initial candidate frame based on the final image feature until the candidate frame is obtained. Adjusting the initial classification result based on the final image feature may be: establishing a classifier for reclassification, and then obtaining the classification result.

Figure 6:
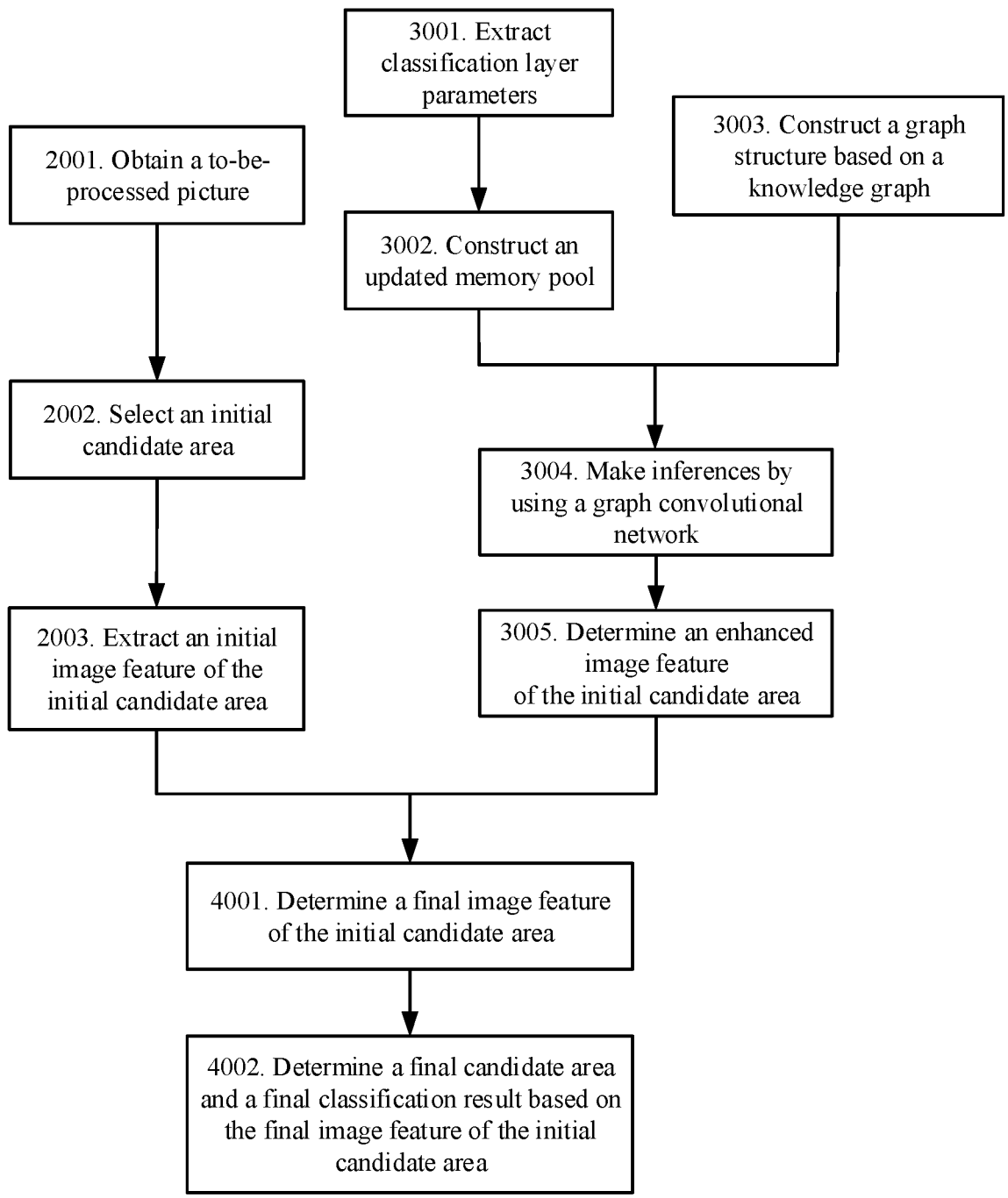
FIG. 6 is a flowchart of an object detection method according to an embodiment of this application.

To better understand a complete procedure of the object detection method in the embodiments of this application, the following describes the object detection method in the embodiments of this application with reference to FIG. 6.

FIG. 6 is a schematic flowchart of an object detection method according to an embodiment of this application.

The method shown in FIG. 6 may be performed by an object detection apparatus, and the object detection apparatus may be an electronic device having an object detection function. For a form of an apparatus specifically included in the electronic device, refer to the related descriptions in the method shown in FIG. 4.

The method shown in FIG. 6 includes step 2001 to step 2003, step 3001 to step 3005, and step 4001 and step 4002. The following describes these steps in detail.

Step 2001 to step 2003 may be detailed implementations (or referred to as specific implementations) of step 1002, step 3001 to step 3005 may be detailed implementations of step 1003, and step 4001 and step 4002 may be detailed implementations of step 1004.

Content of step 2001 to step 2003 mainly includes: selecting an initial candidate area of a to-be-detected image to obtain an initial image feature of the initial candidate area. Content of step 3001 to step 3005 mainly includes: extracting an enhanced image feature of the initial candidate area. Content of step 4001 and step 4002 mainly includes: comprehensively determining a final candidate area and a classification result of the to-be-detected image based on the initial image feature and the enhanced image feature of the initial candidate area.

2001. Obtain a to-be-detected image.

The to-be-detected image herein may be a picture on which object detection needs to be performed. The to-be-detected image may be shot by a camera, or may be obtained from a memory.

A manner of obtaining the to-be-detected image in step 2001 is similar to a manner of obtaining the to-be-detected picture in step 1001, and details are not described herein again.

2002. Select an initial candidate area.

In step 2002, the to-be-detected image may be input into a conventional object detector for processing (for example, Faster-RCNN), to obtain the initial candidate area and an initial classification.

Specifically, in step 2002, convolution processing may be first performed on the to-be-detected image to obtain a convolution feature of the entire to-be-detected image, then the to-be-detected image is divided into different square frames based on a specific-size requirement, a feature corresponding to an image in each square frame is scored, a square frame with a higher score is selected as an initial candidate frame, and an initial classification of an image corresponding to the initial candidate frame is determined based on an image feature corresponding to the initial candidate frame.

2003. Extract an initial image feature of the initial candidate area.

In step 2003, the initial image feature of the initial candidate area may be extracted by using a CNN.

For example, a first image is the to-be-detected image. To obtain an initial candidate frame and an initial classification of a to-be-detected object in the first image, convolution processing may be first performed on the first image to obtain a convolution feature of the first image, then the first image is divided into 4×4 square frames (or may be divided into square frames of another quantity), a feature corresponding to an image in each square frame is scored, and a square frame A and a square frame B that each have a relatively high score are selected as initial candidate frames.

Further, after the initial candidate frames are obtained, an image feature of the entire to-be-detected image (the image feature of the entire to-be-detected image may be obtained by performing convolution processing on the entire to-be-detected image) may be further mapped to the square frame A and the square frame B, to obtain an initial image feature corresponding to the square frame A and an initial image feature corresponding to the square frame B.

3001. Extract classification layer parameters.

In step 3001, the classification layer parameters may be extracted by using a classifier in the object detector (for example, Faster-RCNN), to construct a memory pool to record advanced visual features of each category (for example, colors, shapes, and textures of objects of each category).

In step 3001, the extracted classification layer parameters may be classification layer parameters of all classifications in the classifier in the object detector that performs object detection on the to-be-detected object.

3002. Construct an updated memory pool.

The memory pool may be continuously updated with optimization of the classifier in a training process.

In the training process, classification layer parameters corresponding to different classifications in the classifier may continuously change. In this case, classification layer parameters corresponding to classifications in the memory pool may be updated.

3003. Construct a graph structure based on a knowledge graph.

In step 3003, the graph structure may be constructed based on a manually designed knowledge graph or based on a feature similarity of a candidate area. An obtained graph structure records an association relationship between different nodes, for example, records an attribute relationship graph of different categories, a probability that different categories simultaneously occur, or an attribute similarity graph of different categories.

3004. Make inferences by using a graph convolutional network.

In step 3004, inferences may be made on each node by using the constructed graph structure and by transmitting node information in the memory pool by using the graph convolutional network, to obtain global information.

3005. Determine an enhanced image feature of the initial candidate area.

In step 3005, semantic information of an object category corresponding to another object associated with an object in the initial candidate area may be obtained based on knowledge graph information, and then the semantic information of the object category corresponding to the another object associated with the object in the initial candidate area may be used as the enhanced image feature of the initial candidate area, or a convolution processing result of the semantic information of the object category corresponding to the another object associated with the object in the initial candidate area may be used as the enhanced image feature of the initial candidate area.

4001. Determine a final image feature of the initial candidate area.

In step 4001, the initial image feature and the enhanced image feature of the initial candidate area may be combined to obtain the final image feature of the initial candidate area. For a specific combination process, refer to the related descriptions of combining the initial image feature and the enhanced image feature below step 1004.

4002. Determine a final candidate area and a final classification result based on the final image feature of the initial candidate area.

Specifically, in step 4002, the initial candidate frame may be adjusted based on the final image feature to obtain the final candidate area (or referred to as a final candidate frame), and an initial classification result is corrected based on the final image feature to obtain the final classification result.

It should be understood that, the final candidate area obtained in step 4002 is equivalent to the candidate frame obtained in step 1004, and the final classification result obtained in step 4002 is equivalent to the classification obtained in step 1004.

The foregoing describes in detail the object detection method in the embodiments of this application with reference to the flowchart. To better understand the object detection method in the embodiments of this application, the following describes in detail the object detection method in the embodiments of this application with reference to a more specific flowchart.

Figure 7:
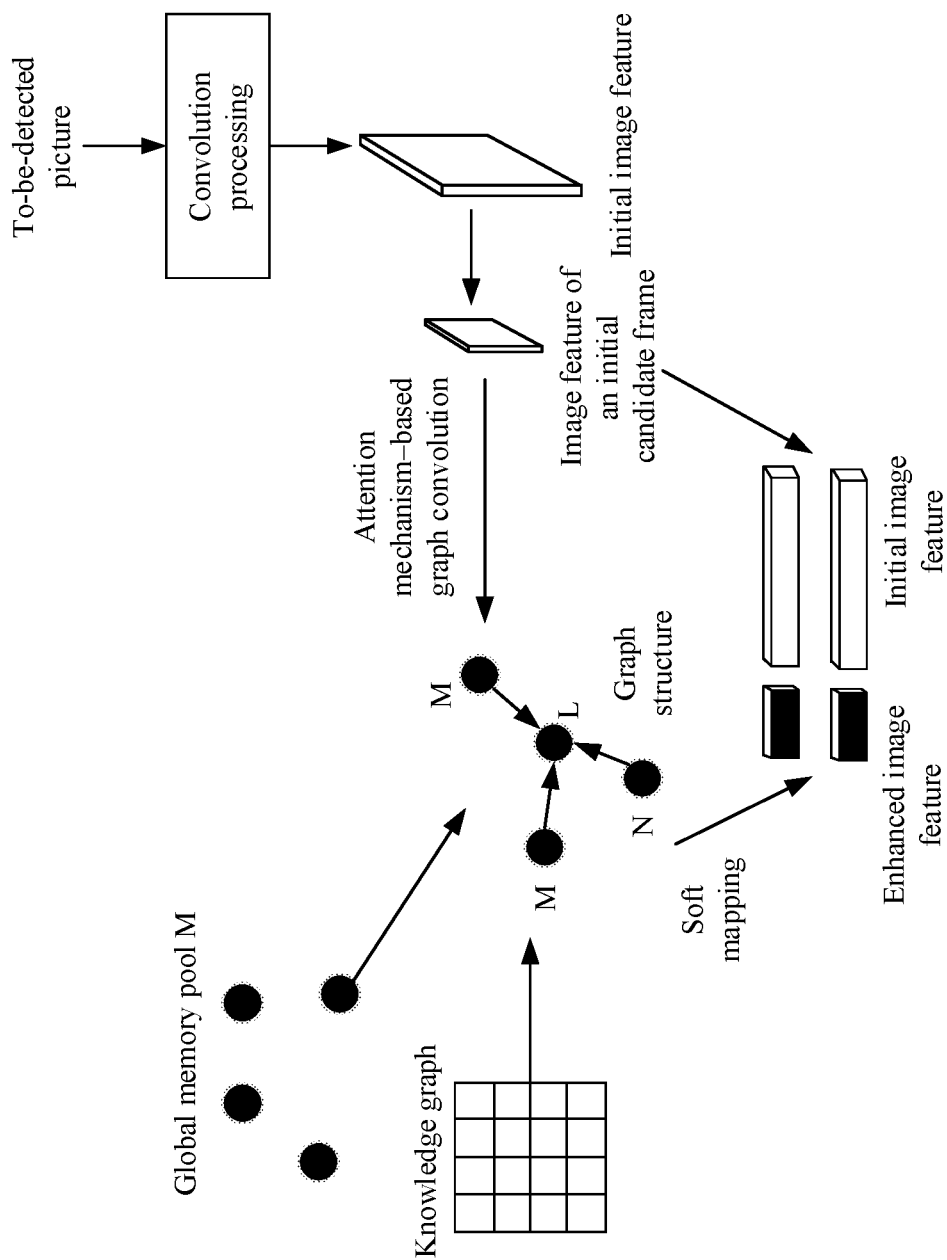
FIG. 7 is a flowchart of an object detection method according to an embodiment of this application.

FIG. 7 is a schematic flowchart of an object detection method according to an embodiment of this application.

The method shown in FIG. 7 may be performed by an object detection apparatus, and the object detection apparatus may be an electronic device having an object detection function. For a form of an apparatus specifically included in the electronic device, refer to the related descriptions in the method shown in FIG. 4.

The method shown in FIG. 7 includes step 1 to step 5. The following separately describes these steps in detail.

Step 1. Construct a graph structure based on a global memory pool and a knowledge graph.

The knowledge graph may be manually constructed, or may be trained by using a neural network. The global memory pool may include classification layer parameters of each object type when object detection is performed on a to-be-detected object.

Step 2. Perform convolution processing on a to-be-detected image to obtain an initial convolution image feature of the to-be-detected image.

In step 2, convolution processing may be performed on the entire to-be-detected image, and an obtained convolution feature of the entire image is the initial convolution image feature of the to-be-detected image.

Step 3. Determine an initial candidate frame of the to-be-detected object and an initial image feature corresponding to the to-be-detected object.

For a specific process of determining the initial candidate frame, refer to the foregoing related descriptions.

After the initial candidate frame is determined, the initial image feature corresponding to the to-be-detected object may be obtained from the initial convolution image feature of the to-be-detected image based on an image area corresponding to the initial candidate frame in the to-be-detected image, where the initial image feature is an image feature of the initial candidate frame shown in FIG. 7.

Step 4. Perform convolution processing on the graph structure in an attention mechanism-based graph convolution manner, to obtain an enhanced image feature of the to-be-detected object.

In step 4, convolution processing is performed on the graph structure in the attention mechanism-based graph convolution manner, that is, convolution processing is performed on another object that is closely related to the to-be-detected object, to obtain the enhanced image feature of the to-be-detected object.

In addition, in step 4, convolution processing may be alternatively performed, in a spatial information-based graph sparse convolution manner, on semantic information of an object (for example, an object adjacent to the to-be-detected object or an object whose distance from the to-be-detected object is within a specific range) that is spatially associated with the to-be-detected object, to obtain the enhanced image feature of the to-be-detected object.

Step 5. Determine a detection result of the to-be-detected object based on the initial image feature of the to-be-detected object and the enhanced image feature of the to-be-detected object.

For a specific process of determining the detection result in step 5, refer to the related descriptions in the method shown in FIG. 4. Details are not described herein again.

The foregoing describes in detail the object detection method in the embodiments of this application with reference to the accompanying drawings. To better describe beneficial effects of the object detection method in the embodiments of this application, the following describes in detail, with reference to specific examples in Table 2 to Table 4, effects of the object detection method in the embodiments of this application compared with a conventional solution.

With reference to specific experimental data, Table 2 is used as an example below to compare effects of object detection performed by using four conventional methods and by using the method in this application. The four conventional methods shown in Table 2 are respectively a conventional method 1 (light-head RCNN), a conventional method 2 (Faster-RCNN w FPN), a conventional method 3 (Cascade RCNN), and a conventional method 4 (Faster-RCNN). The conventional method 3 may also be referred to as a cascade RCNN method.

The method shown in Table 2 in this application means that the attention mechanism-based graph convolution manner is used during convolution processing, and the knowledge graph is manually designed. Test datasets include a version 1.4 visual genome (visual genome (v1.4)) dataset and an ADE dataset, where the Visual Genome (v1.4) dataset has a large-scale general-purpose object detection dataset including 1000 categories and a large-scale general-purpose object detection dataset including 3000 categories, a training dataset including 92 thousand pictures, and a test set including 5000 pictures. The ADE dataset has a large-scale general-purpose object detection dataset including 445 categories, a training dataset including 20 thousand pictures, and a test set including 1000 pictures.

When an object detection effect is evaluated, average precision (average precision, AP) and an average recall (average recall, AR) are mainly used to perform evaluation. In comparison, precision at different thresholds and average precision and an average recall of objects of different sizes are considered.

As shown in Table 2, when different datasets are tested, AP and an AR in the method in this application are respectively greater than AP and ARs in the four conventional methods, and larger values of the AP and the AR indicate better effects of object detection. In Table 2, compared with the conventional method 4, an index increment value of the method in this application is marked. It can be learned from Table 2 that, compared with the conventional method 4, the method in this application has obvious effect improvement.

In addition, compared with the conventional methods, there is no significant increase in a parameter quantity in the method in this application. Therefore, compared with the conventional method 1 to the conventional method 4, the method in this application can ensure that the effect of object detection is improved while the parameter quantity is basically unchanged.

TABLE 2

| Dataset | Method | AP | $AP_{50}$ | $AP_{75}$ | $AR_1$ | $AR_{10}$ | Parameter quantity |
|---|---|---|---|---|---|---|---|
| $VG_{1000}$ | Conventional method 1 | 6.2 | 10.9 | 6.2 | 14.6 | 18 | 80.7M |
| | Conventional method 2 | 7.1 | 12.7 | 7.2 | 14.8 | 19.7 | 80.6M |
| | Conventional method 3 | 6.5 | 12.1 | 6.1 | 15.3 | 19.4 | 64.4M |
| | Conventional method 4 | 6.2 | 11.3 | 5.9 | 14.2 | 17.8 | 60.3M |
| | Method of this application | 8.1 | 13.5 | 8.5 | 18.6 | 23.4 | 63.8M |
| $VG_{3000}$ | Conventional method 1 | 3.0 | 5.1 | 3.2 | 7.3 | 9.0 | 84.7M |
| | Conventional method 2 | 3.7 | 6.5 | 3.7 | 7.6 | 9.8 | 86.3M |
| | Conventional method 3 | 3.8 | 6.5 | 3.4 | 7.1 | 8.5 | 76.5M |
| | Conventional method 4 | 3.7 | 6.4 | 3.8 | 8.5 | 10.5 | 64.3M |
| | Method of this application | 4.5 | 7.3 | 4.7 | 10.6 | 12.9 | 72.4M |
| ADE | Conventional method 1 | 7.0 | 11.7 | 7.3 | 9.6 | 13.3 | 79.4M |
| | Conventional method 2 | 9.3 | 17.7 | 10.7 | 12.4 | 17.9 | 79.0M |
| | Conventional method 3 | 9.1 | 16.8 | 8.9 | 12.1 | 16.4 | 60.9M |
| | Conventional method 4 | 8.7 | 15.5 | 8.9 | 11.7 | 15.9 | 59.0M |
| | Method of this application | 11.5 | 18.8 | 11.9 | 14.8 | 19.9 | 61.3M |

In addition, the object detection method in the embodiments of this application may be further applied based on an existing architecture of a conventional solution. Specific effect may be shown in Table 3. Compared with Table 2, in Table 3, a common object in context (Common Objects in Context, COCO) dataset is added. The dataset has detection labels of 80 common objects, a training dataset including about 11 thousand pictures, and a test set including 5000 pictures. Indicators in Table 3 include mean AP (mean average precision, mAP), a parameter quantity (unit: M), and processing time (unit: ms).

It can be learned from Table 3 that, in the method in this application, identification accuracy and a recall of an existing detector can be greatly improved. In addition, in the method in this application, model parameters are not greatly increased and an inference speed is not greatly decreased.

TABLE 3

| Dataset | Benchmarking method | mAP (%) | Parameter quantity (M) | Time (ms/pic) |
|---|---|---|---|---|
| COCO | FPN inference | 37.3→42.9 | 60.4→61.5 | 73.0→75.3 |
|  | Mask RCNN inference | 39.4→43.2 | 63.4→64.5 | 86.6→89.4 |
| ADE | FPN inference | 10.9→45.5 | 60.8→62.5 | 94.1→99.3 |
| $VG_{1000}$ | FPN inference | 7.1→8.2 | 61.4→63.6 | 123.8→443.2 |
| $VG_{3000}$ | FPN inference | 3.4→4.3 | 63.4→68.2 | 236.1→252.8 |

In this embodiment of this application, in addition to being determined in a manual preset manner, the knowledge graph information may be further obtained through learning. With reference to Table 4, the following compares effects of the method in the embodiments of this application and conventional methods when the knowledge graph information is obtained through learning, and obtained effects are shown in Table 4.

As shown in Table 4, there are five conventional methods. The five conventional methods are respectively a conventional method A (light-head RCNN), a conventional method B (Cascade RCNN), a conventional method C (HKRM), a conventional method D (Faster-RCNN), and a conventional method E (FPN). Based on different implementation architectures, the method in this application may be divided into a method X (Faster-RCNN w SGRN) of this application and a method Y (FPN w SGRN) of this application. It can be learned from Table 4 that, regardless of the method X of this application and the method Y of this application, AP indexes and AR indexes are increased compared with those of the conventional solutions. Therefore, in the object detection method in the embodiments of this application, identification accuracy and a recall of an existing object detector can be greatly improved.

TABLE 4

| Dataset | Method | AP | $AP_{50}$ | $AP_{75}$ | $AR_1$ | $AR_{10}$ | $AR_{100}$ |
|---|---|---|---|---|---|---|---|
| $VG_{1000}$ | Conventional method A | 6.2 | 10.9 | 6.2 | 14.6 | 18.0 | 18.7 |
|  | Conventional method B | 6.5 | 12.1 | 6.1 | 15.3 | 19.4 | 19.5 |
|  | Conventional method C | 7.8 | 13.4 | 8.1 | 18.1 | 22.7 | 22.7 |
|  | Conventional method D | 5.7 | 9.9 | 5.8 | 13.8 | 17.0 | 17.0 |
|  | Method X of this application | 6.8 | 11.1 | 7.1 | 15.3 | 19.5 | 19.6 |
|  | Conventional method F | 7.1 | 12.9 | 7.3 | 14.9 | 19.8 | 20.0 |
|  | Method Y of this application | 6.8 | 13.6 | 8.4 | 19.5 | 26.0 | 26.2 |
| $VG_{3000}$ | Conventional method A | 3.0 | 5.1 | 3.2 | 7.3 | 9.0 | 9.0 |
|  | Conventional method B | 3.8 | 6.5 | 3.4 | 7.1 | 8.5 | 8.6 |
|  | Conventional method C | 4.3 | 7.2 | 4.4 | 10.1 | 12.2 | 12.2 |
|  | Conventional method D | 2.6 | 4.4 | 2.7 | 6.2 | 7.6 | 7.6 |
|  | Method X of this application | 3.2 | 5.0 | 3.4 | 7.3 | 9.2 | 9.2 |
|  | Conventional method F | 3.4 | 6.1 | 3.4 | 6.9 | 9.1 | 9.1 |
|  | Method Y of this application | 4.5 | 7.4 | 4.3 | 10.8 | 13.7 | 13.8 |
| ADE | Conventional method A | 7.0 | 11.7 | 7.3 | 9.6 | 13.3 | 13.4 |
|  | Conventional method B | 9.1 | 16.8 | 8.9 | 12.1 | 16.4 | 16.6 |
|  | Conventional method C | 10.3 | 18.0 | 10.4 | 13.6 | 18.3 | 18.5 |
|  | Conventional method D | 6.9 | 12.8 | 6.8 | 9.3 | 13.3 | 13.6 |
|  | Method X of this application | 9.5 | 15.3 | 10.1 | 12.5 | 17.6 | 17.7 |
|  | Conventional method F | 10.9 | 21.0 | 12.0 | 13.5 | 20.3 | 20.9 |
|  | Method Y of this application | 14.0 | 23.1 | 14.8 | 16.5 | 25.5 | 26.2 |

The foregoing describes in detail the object detection method in the embodiments of this application with reference to the accompanying drawings. In the object detection method in the embodiments of this application, object detection may be implemented by using the neural network (model). In addition, the neural network (model) used herein may be trained according to a specific training method. The following describes a neural network training method in the embodiments of this application with reference to FIG. 8.

Figure 8:
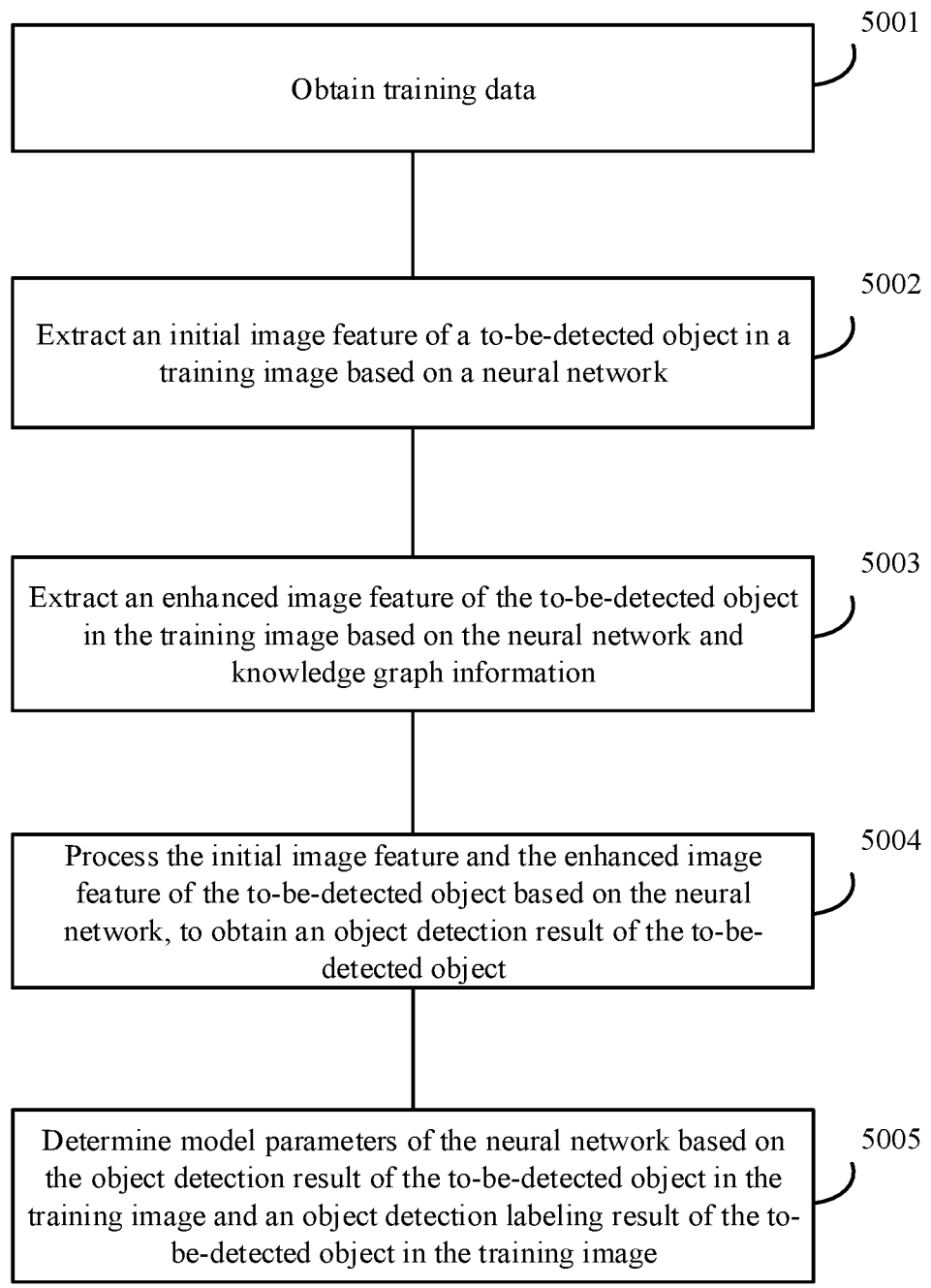
FIG. 8 is a schematic flowchart of a neural network training method according to an embodiment of this application.

FIG. 8 is a schematic flowchart of a neural network training method according to an embodiment of this application. The method shown in FIG. 8 may be performed by a device with a strong computing capability, such as a computer device, a server device, or an operating device. The method shown in FIG. 8 includes step 5001 to step 5005. The following separately describes these steps in detail.

5001. Obtain training data.

The training data in step 5001 includes a training image and an object detection labeling result of a to-be-detected object in the training image.

5002. Extract an initial image feature of the to-be-detected object in a training image based on a neural network.

5003. Extract an enhanced image feature of the to-be-detected object in the training image based on the neural network and knowledge graph information.

The knowledge graph information in step 5003 includes an association relationship between object categories corresponding to different objects in the training image, and the enhanced image feature of the to-be-detected object in the training image indicates semantic information of an object category corresponding to another object associated with the to-be-detected object.

5004. Process the initial image feature and the enhanced image feature of the to-be-detected object based on the neural network, to obtain an object detection result of the to-be-detected object.

5005. Determine model parameters of the neural network based on the object detection result of the to-be-detected object in the training image and the object detection labeling result of the to-be-detected object in the training image.

Optionally, the object detection labeling result of the to-be-detected object in the training image includes a labeled candidate frame and a labeled classification result of the to-be-detected object in the training image.

The labeled candidate frame and the labeled classification result may be pre-labeled (specifically, may be manually labeled).

In addition, in the foregoing training process, a plurality of training images are generally used.

When the neural network is trained, a set of initial model parameters may be set for the neural network, and then the model parameters of the neural network are gradually adjusted based on a difference between the object detection result of the to-be-detected object in the training image and the object detection labeling result of the to-be-detected object in the training image, until the difference between the object detection result of the to-be-detected object in the training image and the object detection labeling result of the to-be-detected object in the training image falls within a preset range, or when a quantity of training times reaches a preset quantity, model parameters of the neural network at this time are determined as final parameters of the neural network model. In this way, training of the neural network is completed.

It should be understood that, the neural network trained by using the method shown in FIG. 8 can be used to perform the object detection method in the embodiments of this application.

In this application, when the neural network is trained, not only the initial image feature of the to-be-detected object in the training image is extracted, but also the enhanced image feature of the to-be-detected object in the training image is extracted, and the object detection result of the to-be-detected object is comprehensively determined based on the initial image feature and the enhanced image feature of the to-be-detected object. In other words, in the training method in this application, more features are extracted in the training process for object detection, so that a neural network with better performance can be trained, and a better object detection effect can be obtained by performing object detection by using the neural network.

Optionally, the knowledge graph information is preset.

Optionally, the knowledge graph information is obtained by training another neural network model based on training data, and the training data includes a training image and object categories to which different objects in the training image belong.

The another neural network model herein may be different from the neural network model trained in the training method shown in FIG. 8.

Optionally, the association relationship between different object categories corresponding to different objects in the training image includes at least one of the following: an attribute association relationship between different object categories; a positional relationship between different object categories; a similarity between word vectors of different object categories; or a probability that different object categories simultaneously occur.

The foregoing describes in detail the object detection method and the neural network training method in the embodiments of this application with reference to the accompanying drawings. The following describes in detail related apparatuses in the embodiments of this application with reference to FIG. 9 to FIG. 11. It should be understood that, object detection apparatuses shown in FIG. 9 and FIG. 10 can perform steps of the object detection method in the embodiments of this application, and a neural network training apparatus shown in FIG. 11 can perform steps of the neural network training method in the embodiments of this application. Repeated descriptions are appropriately omitted in the following descriptions of the apparatuses shown in FIG. 9 to FIG. 11.

Figure 9:
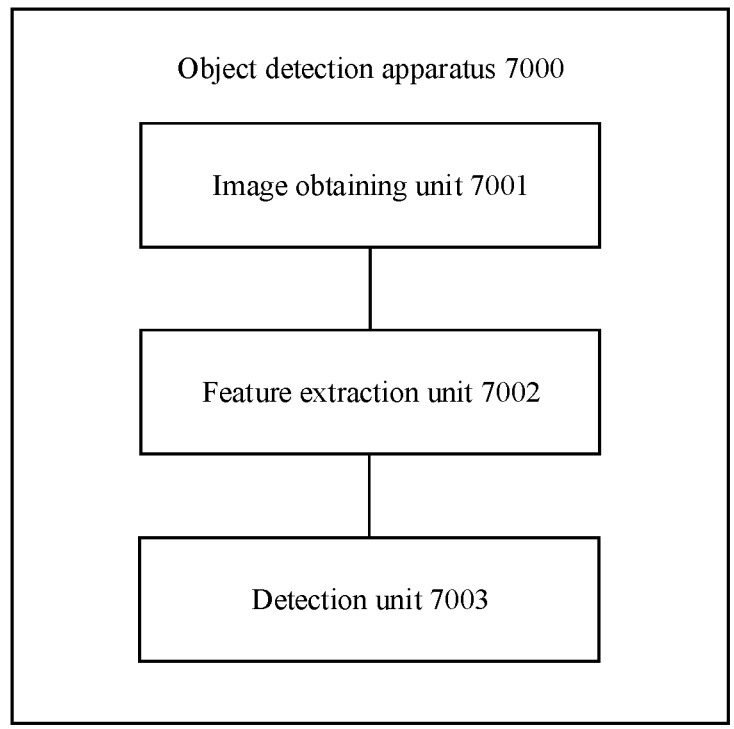
FIG. 9 is a schematic block diagram of an object detection apparatus according to an embodiment of this application.

FIG. 9 is a schematic block diagram of an object detection apparatus according to an embodiment of this application. The object detection apparatus 7000 shown in FIG. 9 includes:

an image obtaining unit 7001, configured to obtain a to-be-detected image;

a feature extraction unit 7002, configured to perform convolution processing on the to-be-detected image to obtain an initial image feature of a to-be-detected object in the to-be-detected image, where the feature extraction unit 7002 is further configured to determine an enhanced image feature of the to-be-detected object based on knowledge graph information; and a detection unit 7003, configured to determine a candidate frame and a classification of the to-be-detected object based on the initial image feature of the to-be-detected object and the enhanced image feature of the to-be-detected object.

The knowledge graph information includes association relationships between different object categories corresponding to different objects in the to-be-detected image, and the enhanced image feature of the to-be-detected object indicates semantic information of an object category corresponding to another object associated with the to-be-detected object.

In this application, when object detection is performed on the to-be-detected image, a detection result of the to-be-detected object is comprehensively determined based on the initial image feature and the enhanced image feature of the to-be-detected object. Therefore, this manner can be used to obtain a better detection result, compared with a manner of obtaining the detection result by considering only the initial image feature of the to-be-detected object.

When the object detection method in the embodiments of this application is performed by the execution device 110 in FIG. 1, the image obtaining unit 7001 in the object detection apparatus 7000 may be equivalent to the I/O interface 112 in the execution device 110, and the feature extraction unit 7002 and the detection unit 7003 in the object detection apparatus 7000 are equivalent to the computation module 111 in the execution device 110.

When the object detection method in the embodiments of this application is performed by the neural network processing unit 50 in FIG. 3, the image obtaining unit 7001 in the object detection apparatus 7000 may be equivalent to the bus interface unit 510 in the neural network processing unit 50, and the feature extraction unit 7002 and the detection unit 7003 in the object detection apparatus 7000 are equivalent to the operation circuit 503 in the execution device 110, or the feature extraction unit 7002 and the detection unit 7003 in the object detection apparatus 7000 may be equivalent to a combination of the operation circuit 503, the vector computation unit 507, and the accumulator 508 in the execution device 110.

Figure 10:
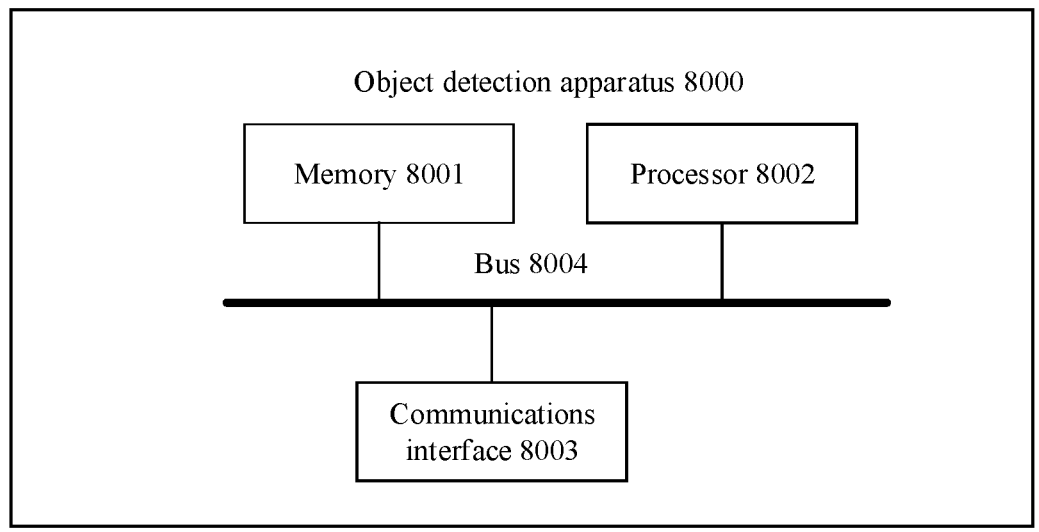
FIG. 10 is a schematic block diagram of an object detection apparatus according to an embodiment of this application.

FIG. 10 is a schematic block diagram of an object detection apparatus according to an embodiment of this application. The object detection apparatus 8000 shown in FIG. 10 includes a memory 8001, a processor 8002, a communications interface 8003, and a bus 8004. Communication connections among the memory 8001, the processor 8002, and the communications interface 8003 are implemented through the bus 8004.

The communications interface 8003 is equivalent to the image obtaining unit 7001 in the object detection apparatus 7000, and the processor 8002 is equivalent to the feature extraction unit 7002 and the detection unit 7003 in the object detection apparatus 7000. The following describes in detail modules and units in the object detection apparatus 8000.

The memory 8001 may be a read only memory (read only memory, ROM), a static storage device, a dynamic storage device, or a random access memory (random access memory, RAM). The memory 8001 may store a program. When the program stored in the memory 8001 is executed by the processor 8002, the processor 8002 and the communications interface 8003 are configured to perform the steps of the object detection method in the embodiments of this application. Specifically, the communications interface 8003 may obtain a to-be-detected image from the memory or another device, and then the processor 8002 performs object detection on the to-be-detected image.

The processor 8002 may be a central processing unit (central processing unit, CPU), a microprocessor, an application-specific integrated circuit (application-specific integrated circuit, ASIC), a graphics processing unit (graphics processing unit, GPU), or one or more integrated circuits, to execute a related program, so as to implement functions that need to be executed by the units in the object detection apparatus in the embodiments of this application (for example, the processor 8002 may implement functions that need to be executed by the feature extraction unit 7002 and the detection unit 7003 in the object detection apparatus 7000), or perform the object detection method in the embodiments of this application.

Alternatively, the processor 8002 may be an integrated circuit chip and has a signal processing capability. In an implementation process, the steps of the object detection method in the embodiments of this application may be completed by a hardware integrated logic circuit in the processor 8002 or by using instructions in a form of software.

The foregoing processor 8002 may be alternatively a general-purpose processor, a digital signal processor (digital signal processor, DSP), an ASIC, a field programmable gate array (field programmable gate array, FPGA) or another programmable logic device, a discrete gate or transistor logic device, or a discrete hardware component. The foregoing general-purpose processor may be a microprocessor, any conventional processor, or the like. Steps of the methods disclosed with reference to the embodiments of this application may be directly executed and accomplished by using a hardware decoding processor, or may be executed and accomplished by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory 8001. The processor 8002 reads information from the memory 8001, and implements, in combination with hardware of the processor 8002, the function that needs to be performed by the unit included in the object detection apparatus in this embodiment of this application, or performs the object detection method in the method embodiment of this application.

The communications interface 8003 uses a transceiver apparatus, for example, but not limited to, a transceiver, to implement communication between the apparatus 8000 and another device or a communications network. For example, a to-be-detected image may be obtained through the communications interface 8003.

The bus 8004 may include a path for information transmission between various components (for example, the memory 8001, the processor 8002, and the communications interface 8003) of the apparatus 8000.

Figure 11:
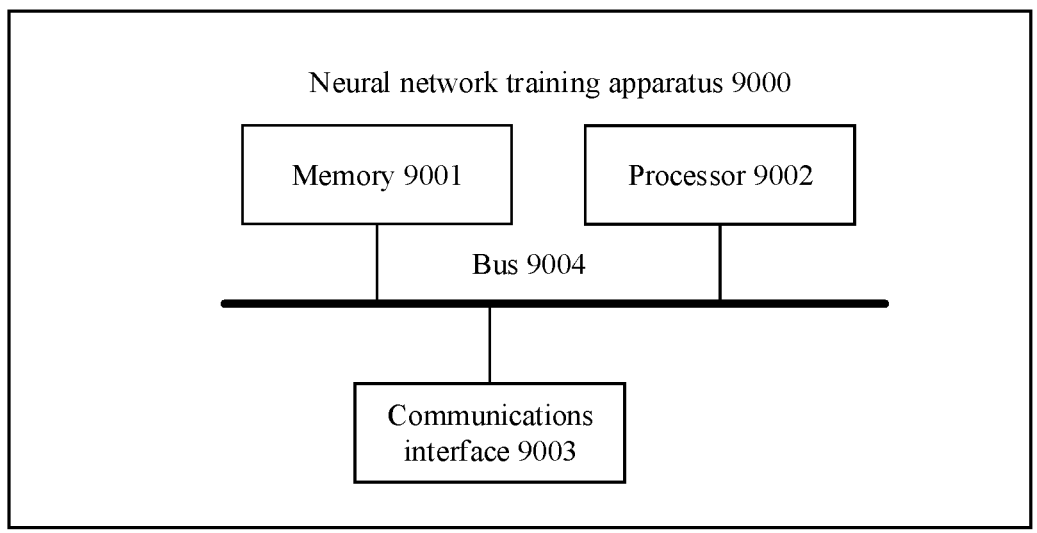
FIG. 11 is a schematic block diagram of a neural network training apparatus according to an embodiment of this application.

FIG. 11 is a schematic diagram of a hardware structure of a neural network training apparatus according to an embodiment of this application. Similar to the apparatus 8000, the neural network training apparatus 9000 shown in FIG. 11 includes a memory 9001, a processor 9002, a communications interface 9003, and a bus 9004. Communication connections among the memory 9001, the processor 9002, and the communications interface 9003 are implemented through the bus 9004.

The memory 9001 may store a program. When executing the program stored in the memory 9001, the processor 9002 is configured to perform steps of the neural network training method in this embodiment of this application.

The processor 9002 may be a general-purpose CPU, a microprocessor, an ASIC, a GPU, or one or more integrated circuits, and is configured to execute a related program, so as to implement the neural network training method in the embodiments of this application.

Alternatively, the processor 9002 may be an integrated circuit chip and has a signal processing capability. In an implementation process, the steps of the neural network training method (the method shown in FIG. 8) in the embodiments of this application may be completed by an integrated logic circuit of hardware in the processor 9002 or by using instructions in a form of software.

It should be understood that, a neural network is trained by using the neural network training apparatus 9000 shown in FIG. 11, and the trained neural network may be used to perform the neural network training method (the method shown in FIG. 8) in the embodiments of this application.

Specifically, the apparatus shown in FIG. 11 may obtain training data and a to-be-trained neural network from the outside through the communications interface 9003, and then the processor trains the to-be-trained neural network based on the training data.

It should be noted that, although only the memory, the processor, and the communications interface are shown in each of the apparatus 8000 and the apparatus 9000, in a specific implementation process, a person skilled in the art should understand that the apparatus 8000 and the apparatus 9000 each may further include another component necessary for normal running. In addition, a person skilled in the art should understand that the apparatus 8000 and the apparatus 9000 may further include, depending on specific requirements, hardware components for implementing other additional functions. In addition, a person skilled in the art should understand that the apparatus 8000 and the apparatus 9000 each may include only components necessary for implementing the embodiments of this application, but not necessarily include all the components shown in FIG. 10 and FIG. 11.

A person of ordinary skill in the art may be aware that units and algorithm steps in the examples described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions of each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Some or all of the units may be selected depending on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the method described in the embodiments of this application. The storage medium includes any medium that can store program code such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An object detection method, comprising:
   obtaining an image;
   performing convolution processing on the image to obtain an initial candidate frame of the image and an initial object category of an object of different objects, wherein the initial object category is determined based on an image feature corresponding to the initial candidate frame;
   extracting an initial image feature of the initial candidate frame;
   determining an enhanced image feature of the object based on knowledge graph information and classification parameters of object categories corresponding to different objects, wherein the knowledge graph information comprises values indicating similarities between the different object categories corresponding to the different objects, and the enhanced image feature indicates semantic information of an object category of the different object categories corresponding to another object of the different objects associated with the object; and
   determining, based on the initial image feature and the enhanced image feature, a final candidate frame in the image where the object is located and a final object category of the different object categories corresponding to the object.

2. The method according to claim 1, wherein the knowledge graph information is preset.

3. The method according to claim 1, wherein the knowledge graph information is obtained by training a neural network model based on training data, and the training data comprises a training image and object categories to which different objects in the training image belong.

4. The method according to claim 1, wherein the knowledge graph information furth comprises an association relationship between the different object categories corresponding to the different objects, wherein the association relationship comprises at least one of the following information:
   an attribute association relationship between the different object categories;
   a positional relationship between the different object categories; or
   a probability that the different object categories simultaneously occur.

5. The method according to claim 1, wherein the determining an enhanced image feature of the object based on knowledge graph information comprises:
   performing convolution processing on the semantic information of the object category corresponding to the another object associated with the object in an attention mechanism-based graph convolution manner or a spatial information-based graph sparse convolution manner, to obtain the enhanced image feature of the object.

6. The method according to claim 1, wherein the method further comprises:
   displaying a detection result of the object, wherein the detection result of the object comprises the candidate frame and the object category of the object.

7. The method according to claim 1, wherein the determining the enhanced image feature of the object comprises:

determining graph structure information based on the knowledge graph information and memory pool information, wherein the classification parameters of object categories corresponding to the different objects are comprised in the memory pool information; and determining the enhanced image feature of the object based on the graph structure information.

8. An object detection apparatus, comprising:
at least one processor; and
one or more memories coupled to the at least one processor and storing programming instructions for execution by the at least one processor to:
obtain an image;
perform convolution processing on the image to obtain an initial candidate frame of the image and an initial object category of an object of different objects, wherein the initial object category is determined based on an image feature corresponding to the initial candidate frame;
extract an initial image feature of the initial candidate frame;
determine an enhanced image feature of the object based on knowledge graph information and classification parameters of object categories corresponding to the different objects, wherein the knowledge graph information comprises values indicating similarities between the different object categories corresponding to the different objects, and the enhanced image feature indicates semantic information of an object category of the different object categories corresponding to another object of the different objects associated with the object; and
determine, based on the initial image feature and the enhanced image feature, a final candidate frame in the image where the object is located and a final object category of the different object categories corresponding to the object.

9. The apparatus according to claim 8, wherein the knowledge graph information is preset.

10. The apparatus according to claim 8, wherein the knowledge graph information is obtained by training a neural network model based on training data, and the training data comprises a training image and object categories to which different objects in the training image belong.

11. The apparatus according to claim 8, wherein the knowledge graph information further comprises an association relationship between the different object categories corresponding to the different objects, wherein the association relationship comprises at least one of the following information:
an attribute association relationship between the different object categories;
a positional relationship between the different object categories; or
a probability that the different object categories simultaneously occur.

12. The apparatus according to claim 8, wherein the programming instructions are for execution by the at least one processor to:
perform convolution processing on the semantic information of the object category corresponding to the another object associated with the object in an attention mechanism-based graph convolution manner or a spatial information-based graph sparse convolution manner, to obtain the enhanced image feature of the object.

13. The apparatus according to claim 8, wherein the programming instructions include instructions for execution by the at least one processor to display, at a display, a detection result of the object, wherein the detection result of the object comprises the candidate frame and the object category of the object.

14. The apparatus according to claim 8, wherein the determine the enhanced image feature of the object comprises:
determining graph structure information based on the knowledge graph information and memory pool information, wherein the classification parameters of object categories corresponding to the different objects are comprised in the memory pool information; and
determining the enhanced image feature of the object based on the graph structure information.

15. A non-transitory computer storage medium storing program code, and the program code comprises instructions for execution by at least one processor to:
obtain an image;
perform convolution processing on the image to obtain an initial candidate frame of the image and an initial object category of an object of different objects, wherein the initial object category is determined based on an image feature corresponding to the initial candidate frame;
extract an initial image feature of the initial candidate frame;
determine an enhanced image feature of the object based on knowledge graph information and classification parameters of object categories corresponding to the different objects, wherein the knowledge graph information comprises values indicating similarities between the different object categories corresponding to the different objects, and the enhanced image feature indicates semantic information of an object category of the different object categories corresponding to another object of the different objects associated with the object; and
determine, based on the initial image feature and the enhanced image feature, a final candidate frame in the image where the object is located and a final object category of the different object categories corresponding to the object.

16. The non-transitory computer storage medium according to claim 15, wherein the knowledge graph information is preset.

17. The non-transitory computer storage medium according to claim 15, wherein the knowledge graph information is obtained by training a neural network model based on training data, and the training data comprises a training image and object categories to which different objects in the training image belong.

18. The non-transitory computer storage medium according to claim 15, wherein the knowledge graph information further comprises an association relationship between the different object categories corresponding to the different objects, wherein the association relationship comprises at least one of the following information:
an attribute association relationship between the different object categories;
a positional relationship between the different object categories; or
a probability that the different object categories simultaneously occur.

19. The non-transitory computer storage medium according to claim 15, wherein the determine an enhanced image feature of the object based on knowledge graph information comprises:
performing convolution processing on the semantic information of the object category corresponding to the another object associated with the object in an attention mechanism-based graph convolution manner or a spatial information-based graph sparse convolution manner, to obtain the enhanced image feature of the object.

20. The non-transitory computer storage medium according to claim 15, wherein the instructions are for execution by the at least one processor to:

display a detection result of the object, wherein the detection result of the object comprises the candidate frame and the object category of the object.

* * * * *

UNITED STATES PATENT AND TRADEMARK OFFICE
CERTIFICATE OF CORRECTION

PATENT NO. : 12,380,687 B2
APPLICATION NO. : 17/553236
DATED : August 5, 2025
INVENTOR(S) : Hang Xu and Zhenguo Li It is certified that error appears in the above-identified patent and that said Letters Patent is hereby corrected as shown below:

In the Claims

In Column 36, In Line 19, In Claim 1, after "to" insert -- the --.

In Column 36, In Line 41, In Claim 4, delete "furth" and insert -- further --.

Signed and Sealed this
Twenty-third Day of December, 2025

John A. Squires
*Director of the United States Patent and Trademark Office*